(12) United States Patent
Pindl et al.

(10) Patent No.: US 10,955,599 B2
(45) Date of Patent: Mar. 23, 2021

(54) LIGHT EMITTER DEVICES, PHOTOACOUSTIC GAS SENSORS AND METHODS FOR FORMING LIGHT EMITTER DEVICES

(71) Applicant: Infineon Technologies AG, Neubiberg (DE)

(72) Inventors: Stephan Pindl, Ergoldsbach (DE); Christoph Glacer, Munich (DE)

(73) Assignee: Infineon Technologies AG, Neubiberg (DE)

(*) Notice: Subject to any disclaimer, the term of this patent is extended or adjusted under 35 U.S.C. 154(b) by 792 days.

(21) Appl. No.: 15/476,667

(22) Filed: Mar. 31, 2017

(65) Prior Publication Data

US 2017/0290097 A1  Oct. 5, 2017

Related U.S. Application Data

(63) Continuation-in-part of application No. 15/089,027, filed on Apr. 1, 2016, now Pat. No. 10,347,814.

(30) Foreign Application Priority Data

Feb. 3, 2017  (DE) .......................... 102017102188.4

(51) Int. Cl.
| | |
|---|---|
| *G02B 5/28* | (2006.01) |
| *G01N 21/17* | (2006.01) |
| *H05B 3/34* | (2006.01) |

(52) U.S. Cl.
CPC ......... *G02B 5/281* (2013.01); *G01N 21/1702* (2013.01); *H05B 3/34* (2013.01);
(Continued)

(58) Field of Classification Search
CPC ............... G02B 5/281; G01N 21/1702; G01N 2021/1704; G01N 2201/06186;
(Continued)

(56) References Cited

U.S. PATENT DOCUMENTS

| | | |
|---|---|---|
| 6,376,787 B1 | 4/2002 | Martin et al. |
| 6,452,124 B1 | 9/2002 | York et al. |

(Continued)

FOREIGN PATENT DOCUMENTS

| | | |
|---|---|---|
| CN | 1806339 A | 7/2006 |
| CN | 101919079 A | 12/2010 |

(Continued)

OTHER PUBLICATIONS

Office Action, in Chinese language, from counterpart Chinese Patent Application No. 201710207663.4, dated Sep. 17, 2018, 8 pp.
(Continued)

*Primary Examiner* — Shawntina T Fuqua
(74) *Attorney, Agent, or Firm* — Shumaker & Sieffert, P.A.

(57) ABSTRACT

A light emitter device includes an emitter component including a heater structure arranged on a membrane structure. The membrane structure is located above a first cavity. Additionally, the first cavity is located between the membrane structure and at least a portion of a supporting substrate of the emitter component. Further, the heater structure is configured to emit light, if a predefined current flows through the heater structure. Additionally, the light emitter device includes a lid substrate having a recess. The lid substrate is attached to the emitter component so that the recess forms a second cavity between the membrane structure and the lid substrate. Further, a pressure in the second cavity is less than 100 mbar.

25 Claims, 20 Drawing Sheets

(52) U.S. Cl.
CPC .............. *G01N 2021/1704* (2013.01); *G01N 2201/06186* (2013.01); *H05B 2203/032* (2013.01)

(58) Field of Classification Search
CPC .. H05B 3/34; H05B 2203/032; H05B 3/0014; H05B 1/023; H05B 1/0233; H01L 41/09; H01L 41/081; H01L 41/083; H01L 2924/00; H01L 2924/15; H01L 2924/15151; H01L 2924/15153; H01L 2924/1616; H01L 2924/1617; H01L 2924/1619; H01L 2924/3512; B81C 1/00158; B81C 1/00166; B81C 1/00182; B81C 1/0019; B81C 1/00198; B81C 2203/0721; B81C 2203/0714; B81C 2203/0764; B81C 2203/0771; H01G 5/40; H01C 2224/13

See application file for complete search history.

(56) References Cited

U.S. PATENT DOCUMENTS

| | | | |
|---|---|---|---|
| 6,633,693 | B1 | 10/2003 | Peale et al. |
| 6,750,596 | B2 | 6/2004 | Kim et al. |
| 6,777,765 | B2 | 8/2004 | Chen et al. |
| 6,943,495 | B2 | 9/2005 | Ma et al. |
| 9,056,764 | B2 | 6/2015 | Tarn |
| 9,118,160 | B2 | 8/2015 | Park et al. |
| 9,417,186 | B2 | 8/2016 | Jakoby et al. |
| 9,513,261 | B2 * | 12/2016 | Dehe .................. G01N 29/30 |
| 9,570,659 | B2 | 2/2017 | Dehe et al. |
| 2003/0080839 | A1 | 5/2003 | Wong |
| 2004/0119126 | A1 | 6/2004 | Chen et al. |
| 2009/0040008 | A1 | 2/2009 | Aksyuk et al. |
| 2010/0126834 | A1 | 5/2010 | Ikehasi |
| 2010/0277040 | A1 | 11/2010 | Klee et al. |
| 2012/0118060 | A1 | 5/2012 | Kimura |
| 2012/0297860 | A1 | 11/2012 | Izawa et al. |
| 2013/0313675 | A1 | 11/2013 | Nakano et al. |
| 2015/0101395 | A1 | 4/2015 | Dehe et al. |
| 2015/0102372 | A1 | 4/2015 | Dehe et al. |

FOREIGN PATENT DOCUMENTS

| | | | |
|---|---|---|---|
| CN | 102197293 | A | 9/2011 |
| CN | 103380353 | A | 10/2013 |
| CN | 104568757 | A | 4/2015 |
| CN | 104576843 | * | 4/2015 |
| CN | 104576843 | A | 4/2015 |
| CN | 104817054 | A | 8/2015 |
| DE | 102004030380 | A1 | 1/2006 |
| DE | 102006059091 | A1 | 7/2007 |
| DE | 102013206755 | A1 | 10/2013 |
| EP | 1640771 | A1 | 3/2006 |
| FR | 2766962 | A1 | 2/1999 |
| GB | 2501681 | A | 11/2013 |
| TW | 552720 | B | 9/2003 |
| WO | 2013159075 | A1 | 10/2013 |

OTHER PUBLICATIONS

Office Action from U.S. Appl. No. 15/089,027, dated Sep. 20, 2018, 6 pp.

Ma, H. et al., "Methane Detection with High Temperature All-silicon Microheater," IEEE, Nov. 2014, pp. 186-189.

Hodgkinson, J. et al., "Non-dispersive infra-red (NDIR) measurement of carbon dioxide at 4.2μm in a compact and optically efficient sensor," Sensors and Actuators B: Chemical, vol. 186, Sep. 2013, pp. 580-588.

Liu, C. et al., "A Micromachined Flow Shear Stress Sensor based on Thermal Transfer Principles," Mar. 1999, vol. 8, No. 1, 24 pp.

Schell, M. et al., "Demand Control Ventilation Using CO2," ASHRAE Journal, Feb. 2001, 6 pp.

Sauer, M. et al., "A Climate Control Sensor for Optimizing the Circulating-Air Mode by Controlling the CO2 Level Inside the Passenger Compartment," Mar. 2007; 7 pp.

Zosel, J. et al., The measurement of dissolved and gaseous carbon dioxide concentration, Meas. Sci. Technol. 22, May 20, 2011, 45 pp.

Souza, M. et al., "Thin-Film Lateral SOI PIN Diodes for Thermal Sensing Reaching the Cryogenic Regime," Journal Integrated Circuits and Systems, vol. 5, No. 2, Sep. 2010, pp. 160-167.

Mastrangelo, C.H. et al., "Vaccum-Sealed Silicon Micromachined Incandescent Light Source," IEDM, 1989, 4 pp.

U.S. Appl. No. 15/089,027, filed by Stephan Pindl et al., filed Apr. 1, 2016.

* cited by examiner

LIGHT EMITTER DEVICES, PHOTOACOUSTIC GAS SENSORS AND METHODS FOR FORMING LIGHT EMITTER DEVICES

This application is a Continuation-in-Part of U.S. application Ser. No. 15/089,027, the entire content of which is incorporated herein by reference. This application also claims priority to and the benefit of German Application Serial No. DE 102017102188.4, filed on Feb. 3, 2017, which claims priority to and the benefit of U.S. application Ser. No. 15/089,027, filed Apr. 1, 2016, the entire content each of which is incorporated herein by reference.

TECHNICAL FIELD

Examples relate to concepts for generating light and applications thereof and in particular to light emitter devices, photoacoustic gas sensors and methods for forming light emitter devices.

BACKGROUND

Light emitter devices (e.g. microelectromechanical systems light emitter devices) may have to be optimized with respect to costs. Nevertheless, it is desired to form light emitter devices with reduced power consumption.

SUMMARY

There may be a demand to provide concepts for light emitter devices with reduced power consumption.

Such a demand may be satisfied by the subject matter of the claims.

Some embodiments relate to a light emitter device. The light emitter device comprises an emitter component comprising a heater structure arranged on a membrane structure. The membrane structure is located above a first cavity. Additionally, the first cavity is located between the membrane structure and at least a portion of a supporting substrate of the emitter component. Further, the heater structure is configured to emit light, if a predefined current flows through the heater structure. Additionally, the light emitter device comprises a lid substrate having a recess. The lid substrate is attached to the emitter component so that the recess forms a second cavity between the membrane structure and the lid substrate. Further, a pressure in the second cavity is less than 100 mbar.

Some embodiments relate to a photoacoustic gas sensor. The photoacoustic gas sensor comprises the light emitter device.

Some embodiments relate to a method for forming a light emitter device. The method comprises forming an emitter component comprising a heater structure arranged on a membrane structure. The membrane structure is located above a first cavity. Additionally, the first cavity is located between the membrane structure and at least a portion of a supporting substrate of the emitter component. Further, the heater structure is configured to emit light, if a predefined current flows through the heater structure. Additionally, the method comprises attaching a lid substrate having a recess to the emitter component so that the recess forms a second cavity between the membrane structure and the lid substrate. A pressure in the second cavity is less than 100 mbar.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
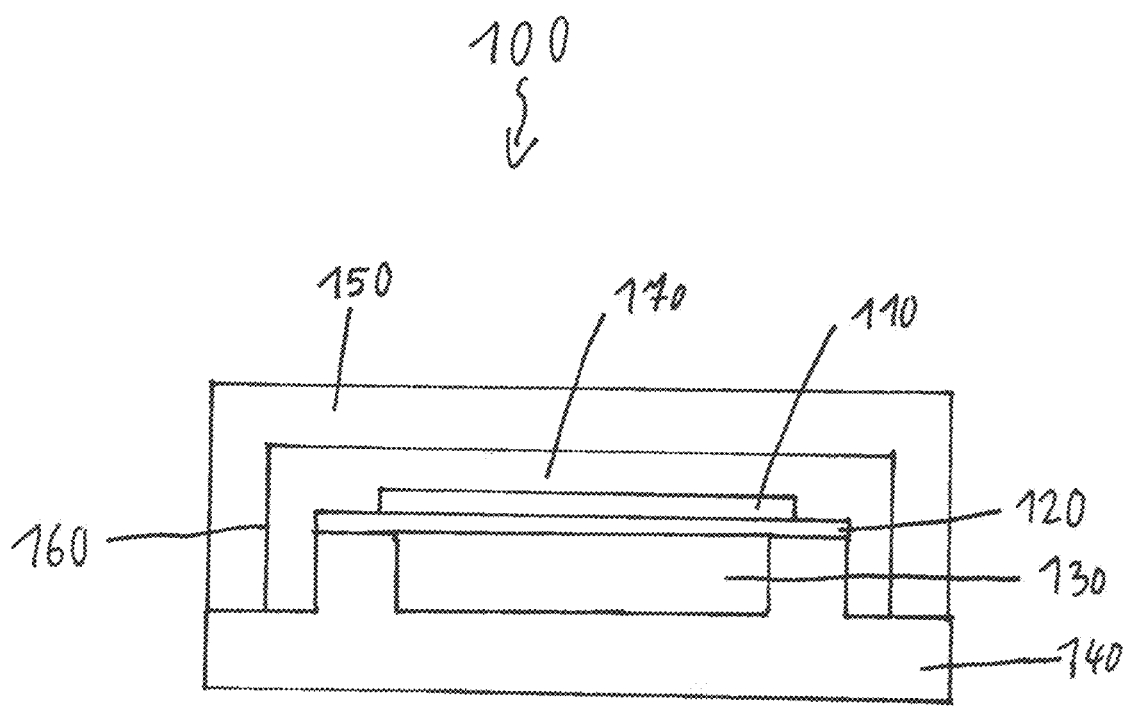
FIG. 1 shows a schematic cross section of a part of a light emitter device.

FIG. 1 shows a schematic cross section of a part of a light emitter device 100. The light emitter device 100 comprises an emitter component comprising a heater structure 110 arranged on a membrane structure 120. The membrane structure 120 is located above a first cavity 130. Additionally, the first cavity 130 is located (vertically) between the membrane structure 120 and at least a portion of a supporting substrate 140 of the emitter component. Further, the heater structure 110 is configured to emit light, if a predefined current flows through the heater structure 110. Additionally, the light emitter device 100 comprises a lid substrate 150 having a recess 160. The lid substrate 150 is attached to the emitter component so that the recess 160 forms a second cavity 170 between the membrane structure 120 and the lid substrate 150. Further, a (gas) pressure in the second cavity 170 is less than 100 mbar (or less than 10 mbar, less than 1 mbar, or less than 0.1 mbar).

Due to the low gas pressure in the second cavity 170 (e.g. compared to the average atmospheric pressure at sea level of 1013 mbar) heat conduction through the second cavity 170 may be reduced. In this way, a loss of power of the light emitter device 100 due to heat conduction may be reduced. By this, a power consumption of the light emitter device 100 may be reduced.

For example, a (quasi-)vacuum may be formed in the second cavity 170. For example, the gas pressure in the second cavity may be greater than 0.001 mbar or greater than 0.01 mbar. For example, a gas pressure in the first cavity 130 may be equal to the gas pressure in the second cavity 170. The first cavity 130 and or the second cavity 170 may be filled with air or with a gas having a lower thermal conductivity than air (e.g. radon, xenon, or argon), for example.

For example, the flow of the predefined current may be generated by applying a voltage to electrical contacts of the heater structure 110. For example, the predefined current may be less than 10 mA (or less than 1 mA, less than 0.1 mA, less than 0.01 mA, or less than 1 µA). The predefined current may be supplied by a supply circuit implemented on the supporting substrate 140 or by an external supply circuit.

The flow of the predefined current through the heater structure 110 may cause a Joule heating of the heater structure 110 and may thereby lead to an emission of heat radiation by the heater structure 100, for example. For example, the heater structure 100 may be configured to emit infrared light (e.g. light with a wavelength in the range of 700 nm to 1mm), visible light (e.g. light with a wavelength in the range of 400 nm to 700 nm) and/or a combination thereof. For example, the heater structure 110 may be configured to emit light with a spectrum comprising a maximal intensity at a wavelength greater than 700 nm and less than 1 mm. A radiation or an emission of light in vacuum may minimize heat conduction through a large air interface within a small gap, for example.

For example, the light emitter device 100 may further comprise an optical filter structure located vertically between the first cavity 130 and the support substrate 140 or between the second cavity 170 and the lid substrate 150. In this way, a wavelength of the emitted light may be efficiently controlled. Additionally, a separate device comprising the optical filter element may be omitted. By this, a dimension (e.g. a size or a height) of a system comprising the light emitter device 100 and the optical filter element may be reduced. Additionally, manufacturing costs of the system may be reduced. For example, the optical filter structure may comprise a Bragg filter with different polysilicon layers and/or insulating layers (e.g. layers comprising silicon oxide or silicon nitride) on a substrate (e.g. on a silicon substrate). For example, the optical filter structure may be located within the recess 160 (e.g. at a surface of the lid substrate 150) or at a front side surface of the supporting substrate 140. The front side surface of the supporting substrate 140 may be the surface of the supporting substrate 140 at which the membrane structure 120 is located, for example.

For example, a light reflective layer or a light absorptive layer may be located vertically between the first cavity 130 and the support substrate 140 or between the second cavity 170 and the lid substrate 150. By this, a direction of a light emission of the light emitter device 100 may be efficiently controlled. The light reflective layer may reflect more than 50% (or more than 80%) of incident light, for example. For example, the light reflective layer may comprise a metal film. For example, the light absorptive layer may absorb more than 50% (or more than 80%) of incident light. The light absorptive layer may comprise a black layer, for example. For example, the light reflective layer or the light absorptive layer may be located within the recess 160 (e.g. at a surface of the lid substrate 150) or at the front side surface of the supporting substrate 140.

For example, the supporting substrate 140 may comprise a supporting layer implemented on the front side surface of a semiconductor substrate or a glass substrate of the supporting substrate 140. In this way, the membrane structure 120 may be efficiently implemented. The supporting layer may be formed by removing a portion of the supporting substrate 140 to form the first cavity 130, for example. For example, the supporting layer may be formed as one continuous element surrounding the first cavity 130. Alternatively, the supporting layer may form at least one wall of the first cavity 130. For example, the membrane structure 120 may be mounted on, fixed to, or anchored to the supporting layer.

For example, the first cavity 130 and the second cavity 170 may be connected through at least one opening through the membrane structure 120. In this way, a gas pressure in the first cavity 130 may be balanced with the gas pressure in the second cavity 170. For example, the gas pressure in the first cavity 130 may be equal to the gas pressure in the second cavity 170.

For example, the light emitter device 100 may further comprise a heater wiring structure for providing the predefined current. The heater wiring structure may comprise a via extending through the supporting substrate 140. By this, an electrical contact for providing the predefined current or a voltage for generating the same may be efficiently provided to the heater structure 110 in a gas-tight manner. For example, an electrical conductive material (e.g. copper or tungsten) may be deposited in a hole through the supporting substrate 140 to form the via. The via may be a through silicon via (TSV), for example. For example, the via may be electrically connected to the heater structure 110 and insulated from a semiconductor substrate of the supporting structure 140. The supply circuit may provide the predefined current or the voltage for generating the same to the via, for example.

For example, the heater wiring structure may comprise a redistribution wiring within a redistribution layer (RDL) located at a (backside) surface of the supporting substrate 140. In this way, a providing of the predefined current or of the voltage for generating the same may be simplified. For example, the (back side) surface of the supporting substrate 140 may be the surface of the supporting substrate 140 opposite to the front side surface at which the membrane structure 120 is implemented. The redistribution layer may comprise (or embed) one or more redistribution wiring structures implemented by an electrical conductive material (e.g. copper or tungsten), for example. For example, the redistribution wiring may be electrically connected to the via.

For example, the light emitter device 100 may further comprise a wiring structure for providing different voltages to a bias structure of the supporting substrate 140 or of the lid substrate 150 and to the membrane structure 120 to electrostatically move at least a portion of the membrane structure 120 towards the support substrate 140 or the lid substrate 150. By this, the membrane structure 120 and thereby also the heater structure 110 may be efficiently cooled by contacting the support substrate 140 or the lid substrate 150. For example, the portion of the membrane structure 120 may be moved away from the support substrate 140 or the lid substrate 150 during an emission or radiation operation mode of the light emitter device 100 and may be moved towards the support substrate 140 or the lid substrate 150 and thereby cooled down during a non-emission or non-radiation operation mode of the light emitter device 100. For example, a movable membrane structure 120 may allow fast switching between radiation and non-radiation operation mode.

For example, the bias structure of the supporting substrate 140 or of the lid substrate 150 may comprise a grounding layer located between the first cavity 130 and the supporting substrate 140 or between the second cavity 170 and the lid substrate 150. The wiring structure may be electrically connected to the grounding layer. In this way, the supporting substrate 140 or the lid substrate 150 and the membrane structure 120 may be efficiently put to different potentials. For example, the grounding layer may be located within the first cavity 130 at the front side surface of the supporting substrate 140 or within the recess 160 at a surface of the lid substrate 150. The grounding layer may comprise copper, tungsten or polysilicon, for example. For example, the light emitter device 100 may comprise a further supply circuit for providing different voltages to the grounding layer and the membrane structure 120. The further supply circuit may be implemented on the supporting substrate 140 or an external further supply circuit, for example.

For example, at least a portion of the supporting substrate 140 may be a semiconductor substrate or a glass substrate. For example, at least a portion of the lid substrate 150 may be a semiconductor substrate or a glass substrate. For example, a semiconductor substrate may be a silicon based substrate, a silicon carbide (SiC)-based semiconductor substrate, a gallium arsenide (GaAs)-based semiconductor substrate, or a gallium nitride (GaN)-based semiconductor substrate. A semiconductor substrate may be a semiconductor wafer or a semiconductor die or a part of a semiconductor wafer or a semiconductor die, for example. For example, a glass substrate may be a silica (e.g. $SiO_2$) based glass substrate, a borosilicate based glass substrate, an aluminosilicate based glass substrate, or an oxide based glass substrate. A glass substrate may be a glass wafer, a glass lid wafer, or a glass lid or a part of a glass wafer, a glass lid wafer, or a glass lid, for example.

For example, the membrane structure 120 may comprise a heat spreader structure. An (first) insulating layer may be located between the heat spreader structure and the heater structure 110. By this, a smoother emission of light may be achieved. For example, the head spreader structure may form a heat spreader layer. The heat spreader structure may comprise a material with high optical emissivity in a wavelength of interest (e.g. black platinum, graphene, polysilicon or silicon), for example. For example, the (first) insulating layer may comprise a nitride or an oxide (e.g. silicon nitride or silicon oxide).

For example, the heater structure 110 may comprise a first layer comprising a first metal and a second layer comprising a second metal. The second layer may cover the first layer. For example, the first metal may be titanium and the second metal may be platinum. Alternatively, the heater structure may comprise a single metal layer. For example, the single metal layer may comprise tungsten.

For example, the heater structure 110 may be covered by a second insulating layer. For example, the second insulating layer may comprise a nitride or an oxide (e.g. silicon nitride or silicon oxide).

For example, at least a portion of the heater structure 110 may have a meander shape or a ring shape. In this way, a length of the heater structure 110 may be increased. By this, an electrical resistance of the heater structure 110 and thereby a Joule heating of the heater structure 110 due to the flow of the predefined current may be increased. In this way, an intensity of the emission of light may be increased. For example, the recess 160 may have a rectangular (lateral) cross section.

For example, the lid substrate 150 may be attached to the emitter component in a gas-tight manner. In this way, a gas-tight sealing of the light emitter device 100 may be omitted. For example, the lid substrate 150 may be anodic bonded to the emitter component. For example, at an interface of the lid substrate 150 and the supporting substrate 140 a glass may be in contact with a semiconductor material.

For example, the light emitter device 100 may form a micro electro-mechanical system (MEMS) device. The MEMS device may comprise an anchoring element located at a surface of the supporting substrate 140. Additionally, the MEMS device may comprise the heater structure 110 anchored to the supporting substrate 140 by the anchoring element. The MEMS device may further comprise the lid substrate 150 having the recess 160 at a surface of the lid substrate 150. The lid substrate 150 may be bonded to the supporting substrate 140 such that the recess 160 forms the second cavity 170 between the supporting substrate 140 and the lid substrate 150. Further, the heating structure 110 may be located inside the second cavity 170. Additionally, the gas pressure in the second cavity 170 may be less than 100 mbar. For example, the anchoring element may be formed from an oxide (e.g. from silicon oxide) by growing an oxide layer on the supporting substrate 140 and etching of the grown oxide layer.

The light emitter device 100 may be an infrared (IR) emitter or a MEMS IR emitter, for example. For example, the light emitter device 100 may be an element of a photoacoustic gas sensor, a photoacoustic spectroscopy system, a thermal flow sensor, or a mobile device (e.g. a smartphone or a tablet computer). The light emitter device 100 may be used to realize any other gas sensor principle, where emitted optical radiation is used to trigger a sensor effect such as NDIR sensor systems, for example.

For example, the light emitter device 100 (e.g. an IR emitter chip) may be realized as a MEMS chip with a thin heater membrane, a cavity in the silicon substrate and optionally a vent hole. Additionally, the infrared filter structure (e.g. an IR filter chip) may be realized as a Bragg reflector with different poly/oxide layers on a silicon substrate.

For example, a vertical direction may be measured orthogonal to the front side surface of the supporting substrate 140 or of the lid substrate 150 and a lateral direction may be measured in parallel to the front side surface of the supporting substrate 140 or of the lid substrate 150. The front side or front side surface of the supporting substrate 140 or of the lid substrate 150 may be the side used to implement more sophisticated and complex structures than at the back side of the supporting substrate 140 or of the lid substrate 150, since the process parameters (e.g. temperature) and the handling may be limited for the back side, if structures are already formed at one side of the supporting substrate 140 or of the lid substrate 150, for example.

Figure 2:
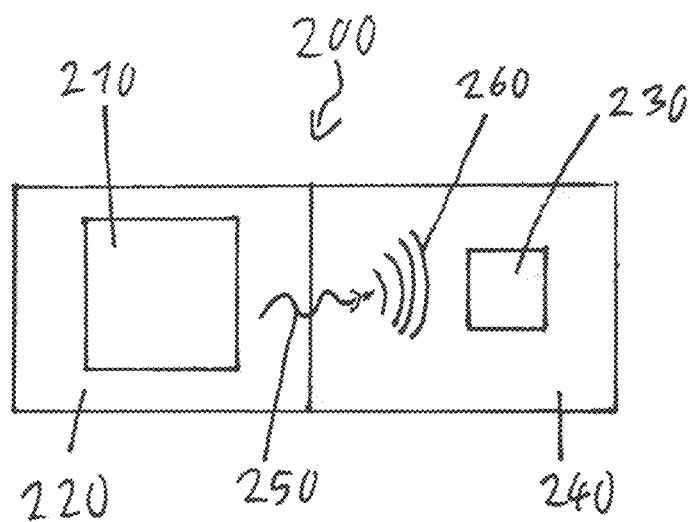
FIG. 2 shows a schematic illustration of a photoacoustic gas sensor.

FIG. 2 shows a schematic illustration of a photoacoustic gas sensor 200. The photoacoustic gas sensor 200 comprises a light emitter device 210. The implementation of the light emitter device 210 may be similar to the implementation of the light emitter device described in connection with FIG. 1. The light emitter device 210 is arranged within a volume 220 intended to be filled with gas to be analyzed (e.g. air or a gas comprising carbon dioxide ($CO_2$) or carbon monoxide (CO)). The photoacoustic gas sensor 200 further comprises a pressure sensitive module 230 (e.g. a microphone) arranged within a reference gas volume 240. The reference gas volume 240 is separated from the volume 220 intended to be filled with gas to be analyzed. Additionally, the light emitter device 210 is configured to emit a light pulse 250 to cause an acoustic wave 260 in the reference gas volume 240 by interacting with a reference gas (e.g. nitrogen) within the reference gas volume 240. The pressure sensitive module 230 may be configured to detect the acoustic wave 260 and to generate, on basis of the detected acoustic wave 260, a sensor signal indicating information on the acoustic wave 260. Since the emitted light pulse 250 passes a portion of the volume 220 intended to be filled with gas to be analyzed, the generated sensor signal may further indicate information (e.g. a $CO_2$ concentration or a CO concentration) on the gas to be analyzed within the volume 220. Further, the photoacoustic gas sensor 200 may comprise an inlet and/or an outlet for filling the volume 220 with the gas to be analyzed.

More details and aspects are mentioned in connection with the embodiments described above or below. The embodiment shown in FIG. 2 may comprise one or more optional additional features corresponding to one or more aspects mentioned in connection with the proposed concept or one or more embodiments described above (e.g. FIG. 1) or below (e.g. FIG. 3-7h).

Figure 3:
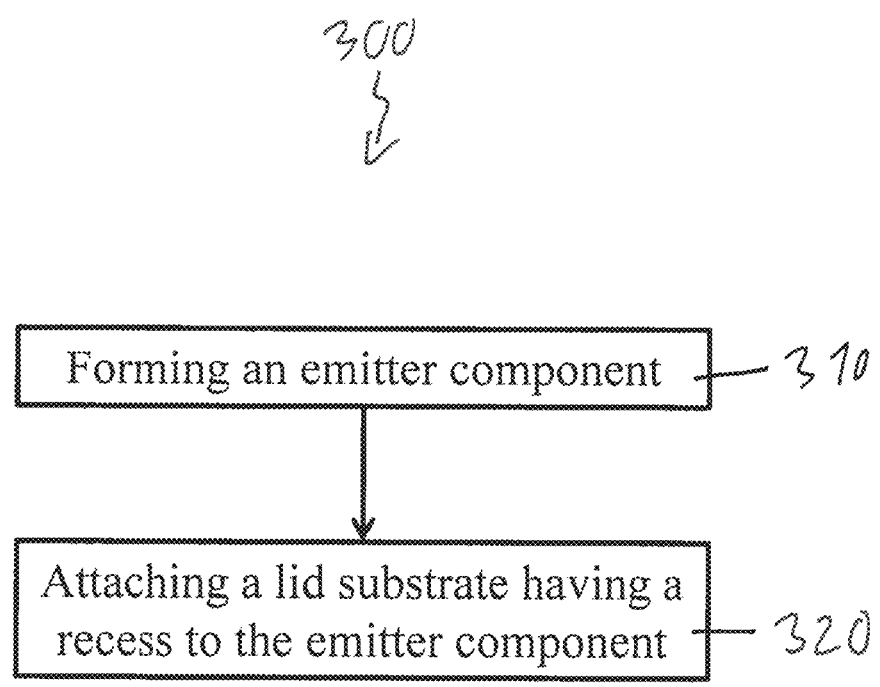
FIG. 3 shows a flow chart of a method for forming a light emitter device.

FIG. 3 shows a flow chart of a method 300 for forming a light emitter device. The method 300 comprises forming 310 an emitter component comprising a heater structure 110 arranged on a membrane structure 120. The membrane structure 120 is located (vertically) above a first cavity 130. Additionally, the first cavity 130 is located between the membrane structure 120 and at least a portion of a supporting substrate 140 of the emitter component. Further, the heater structure 110 is configured to emit light, if a predefined current flows through the heater structure 110. Additionally, the method 300 comprises attaching 320 a lid substrate 150 having a recess 160 to the emitter component so that the recess 160 forms a second cavity 170 between the membrane structure 120 and the lid substrate 150. A (gas) pressure in the second cavity 170 is less than 100 mbar.

In this way, a light emitter device having a low power loss due to heat conduction may be efficiently formed. By this, a light emitter device with reduced power consumption may be formed.

For example, the membrane structure 120 may be formed by depositing a heat spreader structure (e.g. a polysilicon layer) on a base substrate of the support structure 140. Additionally, the heat spreader structure may be covered by an insulating layer (e.g. a nitride layer). The heater structure 110 may be formed by depositing at least one metal layer (e.g. comprising tungsten or titanium/platinum) on the insulating layer covering the heat spreader structure. The first cavity 130 may be formed by an etching of the support substrate 140 after forming of the heater structure 110, for example. For example, the recess 160 may be formed in the lid substrate 150 by an etching process. For example, attaching 320 of the lid substrate 150 to the emitter component may be performed in a (quasi-)vacuum or at an environmental gas pressure of less than 100 mbar (or less than 10 mbar, less than 1 mbar, or less than 01.mbar).

For example, attaching 320 of the lid substrate 150 to the emitter component may comprise an anodic bonding of the lid substrate 150 to the emitter component. In this way, the lid substrate 150 may be efficiently fixed at the supporting substrate 140. Alternatively, attaching 320 of the lid substrate 150 to the emitter component may comprise a metal-metal bonding, a wafer bonding, a eutectic bonding, a hermetically sealed bonding, or a spin on glass bonding.

More details and aspects are mentioned in connection with the embodiments described above or below. The embodiment shown in FIG. 3 may comprise one or more optional additional features corresponding to one or more aspects mentioned in connection with the proposed concept or one or more embodiments described above (e.g. FIG. 1-2) or below (e.g. FIG. 4a-7h).

Figure 4A:
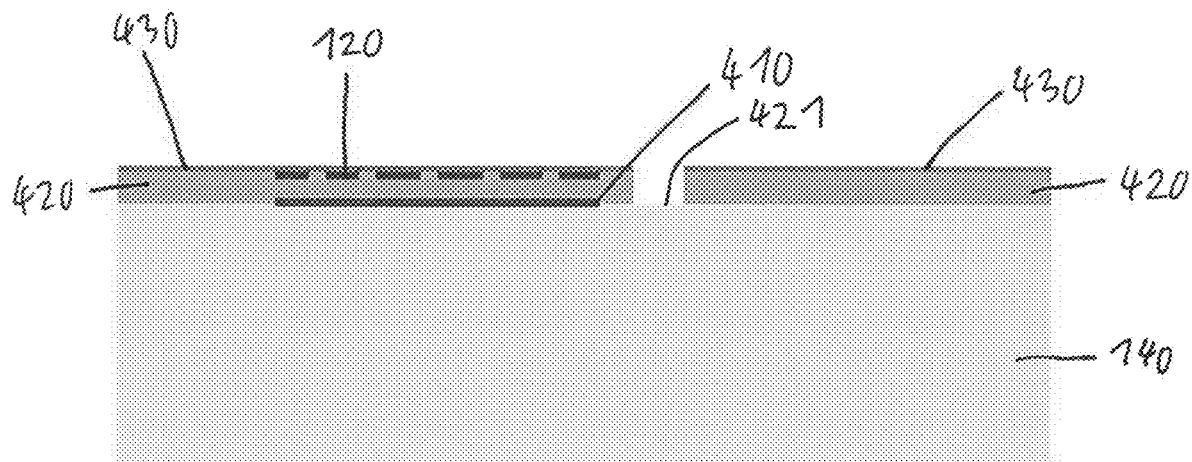
FIGS. 4a-4i show process steps for forming a light emitter device.

FIGS. 4a to 4i show process steps for forming a light emitter device 400. The method for forming the light emitter device 400 may be similar to the method described in connection with FIG. 3. FIG. 4a shows a supporting substrate 140 on which an infrared (IR) filter structure 410, a first insulating layer 420, a second insulating layer 430 and a membrane structure 120 are formed. For example, the supporting substrate 140 may be a silicon based substrate. The infrared filter structure 410 may comprise a layer stack of polysilicon layers and insulating layers (e.g. silicon oxide layers or silicon nitride layers), for example. For example, the infrared filter structure 410 may be a Bragg reflector with different polysilicon/oxide layers. For example, the first insulating layer 420 may comprise an oxide (e.g. silicon oxide) and the second insulating layer 430 may comprise a nitride (e.g. silicon nitride). The membrane structure 120 may comprise a heat spreader structure (e.g. formed from polysilicon).

For example, the supporting substrate 140 (e.g. a Si substrate wafer) may be preprocessed with the infrared filter structure 410 (e.g. an IR filter layer), the first insulating layer 420 (e.g. an oxide layer) and the membrane structure 120 (e.g. a polysilicon heat spreader layer). On top of it the second insulating layer 430 (e.g. a nitride layer) may be deposited and a hard mask 421 for a through silicon via (TSV) formation may be etched.

Figure 4B:
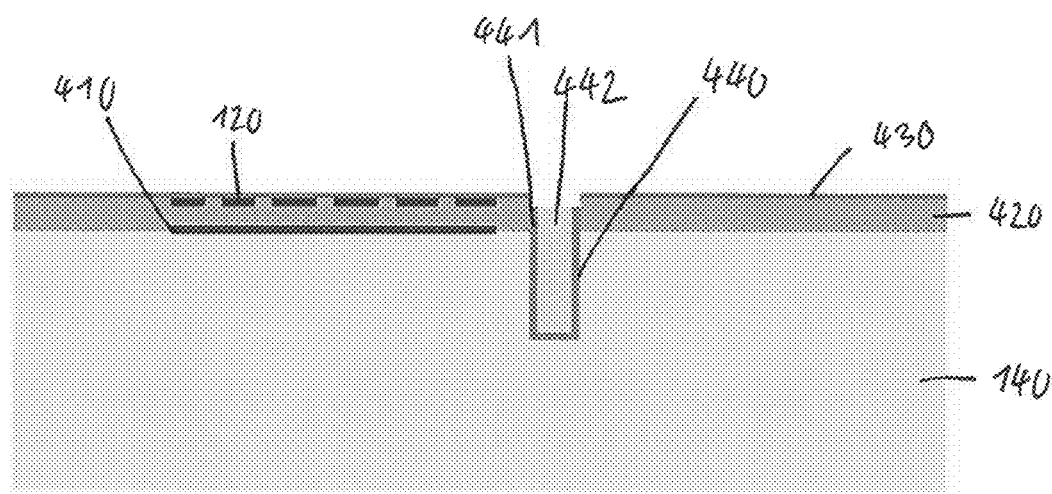

As shown in FIG. 4b a trench 440 is etched into the supporting substrate 140. Further, an insulating layer 441 is formed inside the trench 440. Additionally, an electrically conductive material 442 (e.g. copper (Cu) or tungsten) is deposited inside the trench 440. The insulating layer 441 isolates the electrically conductive material form the supporting substrate 140. For example, the trench 440, the insulating layer 441 and the electrically conductive material 442 may form a TSV (e.g. a Cu-TSV). For example, a TSV may be formed with trench etch, isolation and typically copper or tungsten fill. The predefined current may be provided to the (not yet formed) heater structure 110 through the TSV or the electrically conductive material 442. For example, a further TSV may be formed in the supporting substrate 140 for providing the predefined current to the heater structure 110.

Figure 4C:
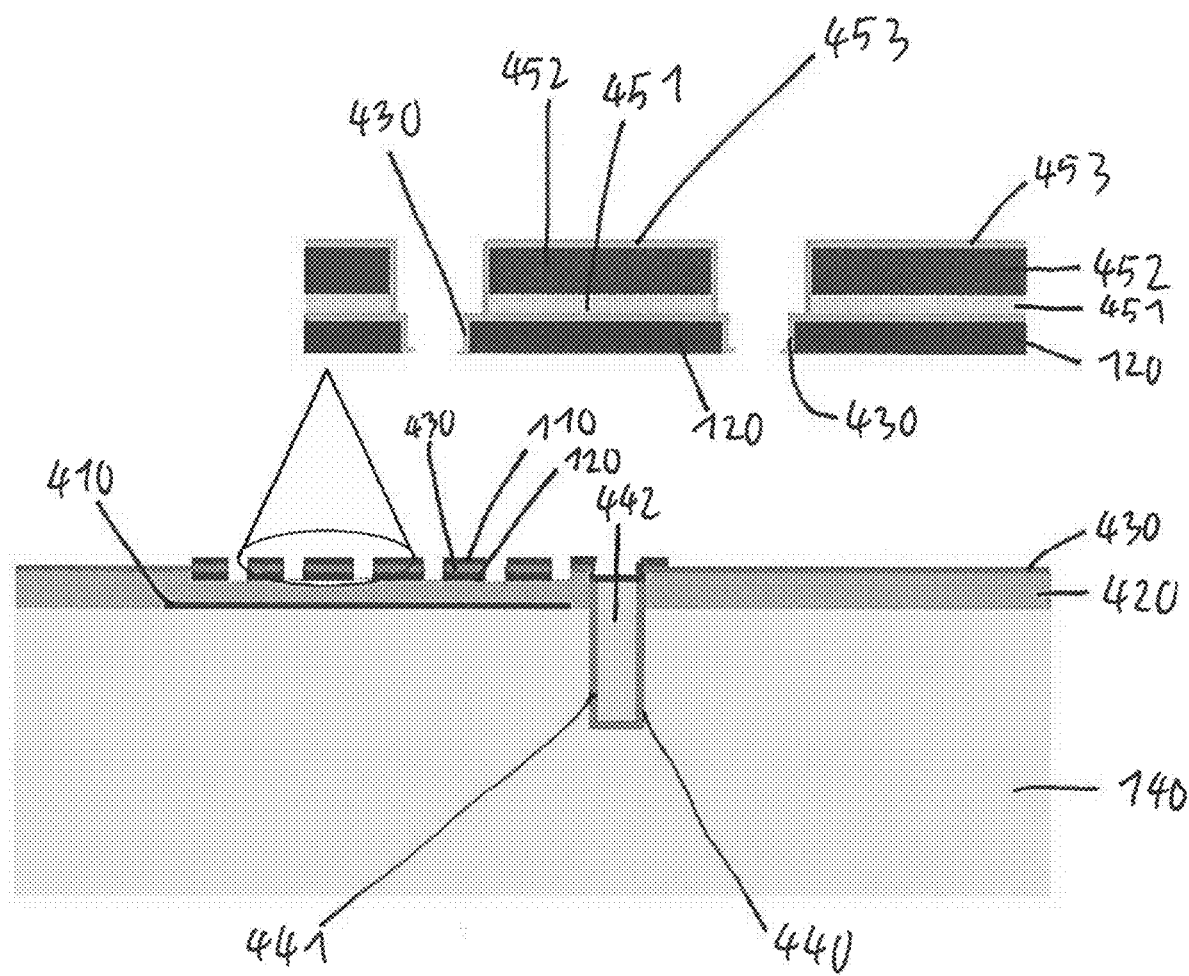

A heater structure 110 is formed on the membrane structure 120 as shown in FIG. 4c. The heater structure 110 comprises a first layer 451 comprising a first metal (e.g.

titanium), a second layer 452 comprising a second metal (e.g. platinum) and covering the first layer 451, and an insulating layer 453 (e.g. a nitride) covering the second layer 452. The second insulating layer 430 is located between the heater structure 110 and the membrane structure 120.

For example, the heater structure 110 or a metal heater (e.g. Ti/Pt or W) may be formed and covered by the insulating layer 453 (e.g. a nitride layer), which is opened within the spacing of the heat spreader layer of the membrane structure 120. For example, the heat spreader layer may comprise a material with a high optical emissivity in the wavelength of interest, such as black platinum, graphene or silicon. The infrared filter structure 410 (e.g. a filter layer) and/or the supporting substrate 140 may also be contacted by the metal of the heater structure 110 (e.g. to form a counter electrode for the heat spreader layer).

Figure 4D:
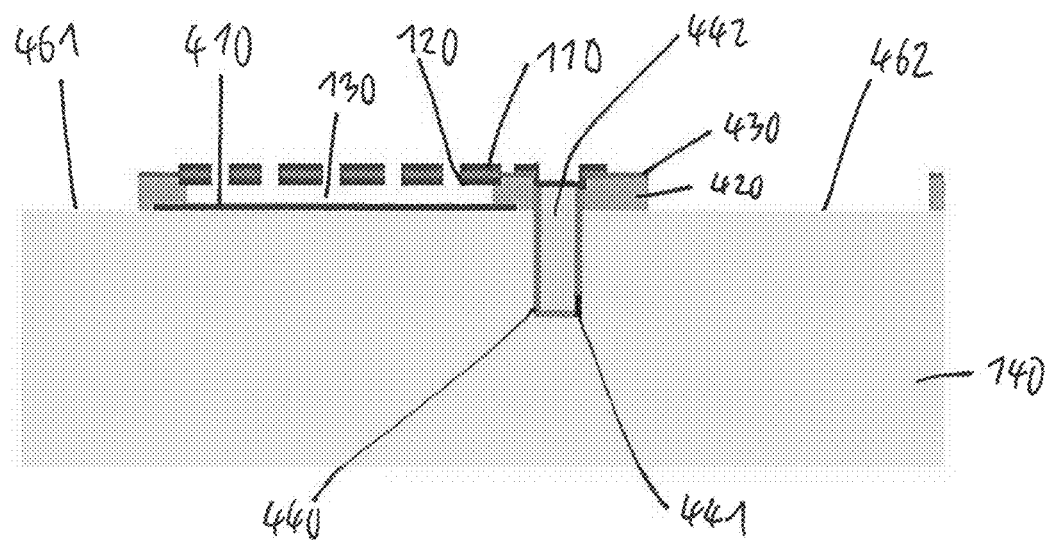

As shown in FIG. 4d a first cavity 130 is formed by etching the first insulating layer 420 between the membrane structure 120 and the infrared filter structure 410. For example, the first insulating layer 420 (e.g. an oxide) may be etched between the membrane structure 120 or a heat spreader structure (e.g. a heat spreader layer) thereof and the infrared filter structure 410 (e.g. a filter layer) and at regions 461, 462, where anodic bonding may be performed later on, by a wet chemical etch. Etching of the first insulating layer 420 may comprise an oxide release etch, for example.

Figure 4E:
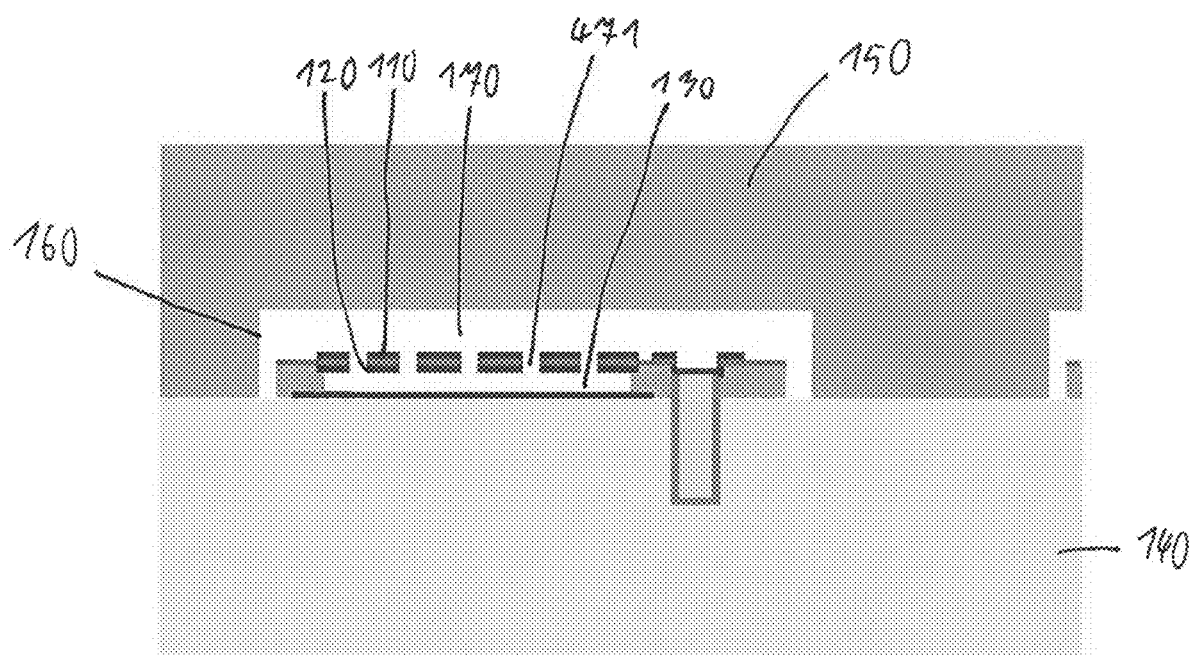

A lid substrate 150 (e.g. a glass lid wafer) having a recess 160 is attached to the supporting substrate 140 as shown in FIG. 4e. The recess 160 forms a second cavity 170 between the membrane structure 120 and the lid substrate 150. The membrane structure 120 comprises a plurality of openings 471 which connect the first cavity 130 with the second cavity 170. For example, the lid substrate 150 may be anodic bonded to the supporting substrate 140 in vacuum. For example, the lid substrate 150 (e.g. a lid glass wafer) with the recess 160 (e.g. an etched cavity) in the region of the heater structure 110 may be bonded on the supporting substrate 140 (e.g. a substrate wafer) by anodic bonding under vacuum.

Figure 4F:
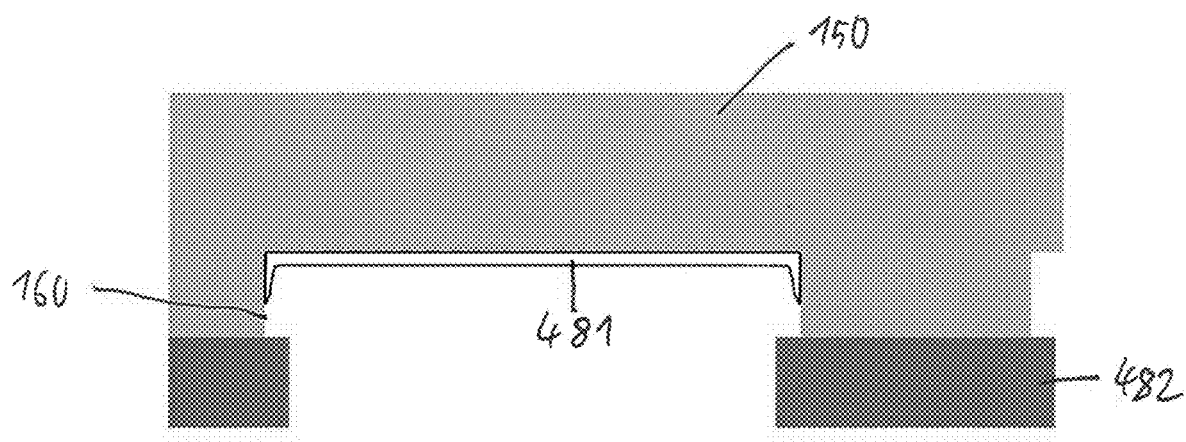

FIG. 4f shows an optional process step, in which a coating 481 is formed within the recess 160 of the lid substrate 150. The coating 481 may be a light reflective coating (e.g. a metal film) or a light absorptive coating (e.g. a black film). For example, forming of the coating 481 may comprise a deposition of a metal film on the lid substrate 150 (e.g. on a glass wafer). During the forming of the coating 481 the lid substrate 150 may be attached to a lift-off resist element 482. For example, optionally a reflective and/or absorptive coating of the lid substrate 150 may be done.

Figure 4G:
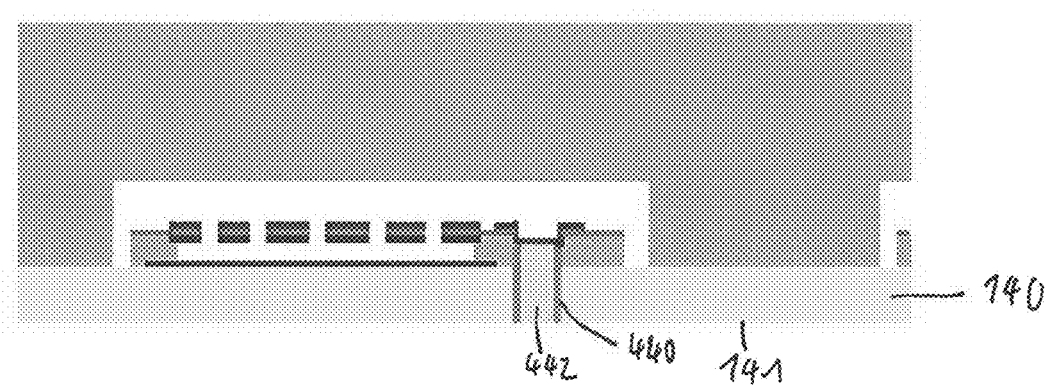

As shown in FIG. 4g the supporting substrate 140 is thinned such that the trench 440 is opened and the electrically conductive material 442 can be electrically contacted at a back side 141 of the supporting substrate 140. For example, the supporting substrate 140 (e.g. a substrate wafer) may be thinned by wafer grinding and/or plasma etching. The TSV may be opened during this thinning process, for example.

Figure 4H:
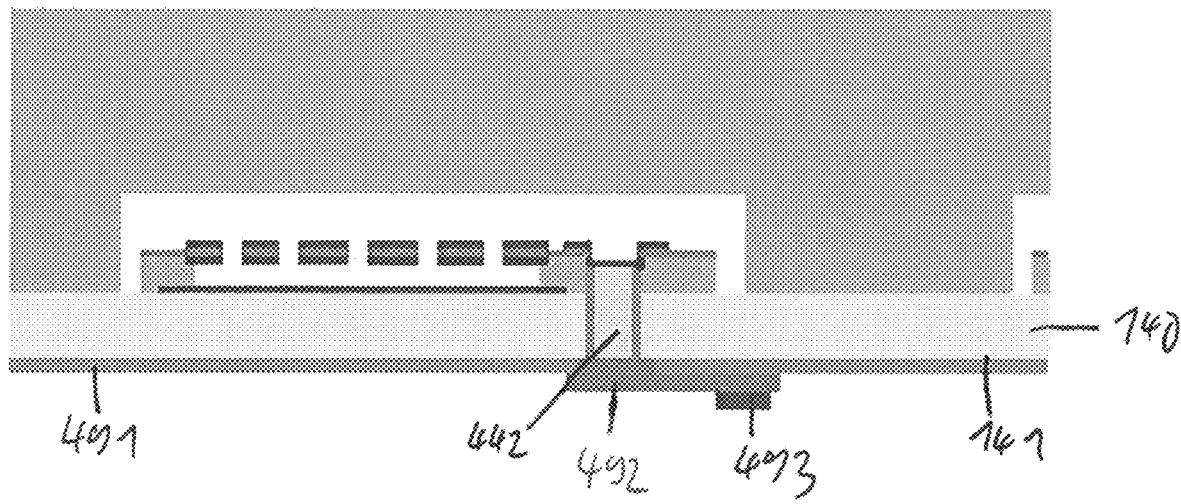

An insulating layer 491 (e.g. an oxide) and a redistribution layer 492 with a pad 493 is formed at or on the back side 141 of the supporting substrate 140 as shown in FIG. 4h. The redistribution layer 492 electrically contacts the electrically conductive material 442. For example, on the back side 141 of the supporting substrate 140 a redistribution layer (RDL) 492 may be formed with pads 493 for nail head bonding or bumps. Any or each type of metallization and pad formation may be used in the RDL 492, for example.

Figure 4I:
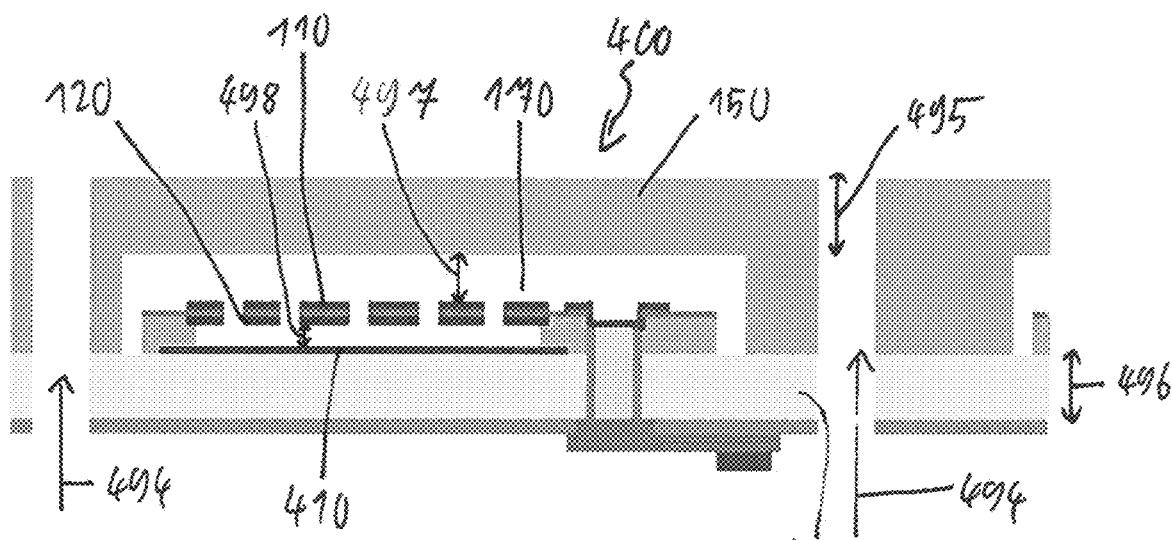

As shown in FIG. 4i the lid substrate 150 (e.g. a lid wafer) is thinned to a target thickness and a wafer sawing of the supporting substrate 140 and the lid substrate 150 is performed as indicated by arrows 494 to form the light emitter device 400. A vertical dimension 495 of the lid substrate 150 may be chosen depending on the gas pressure in the second cavity 170. For example, the vertical dimension 495 may be greater than 1 μm (e.g. greater than 10 μm, greater than 30 μm, greater than 50 μm, or greater than 100 μm). A vertical dimension 496 of the supporting layer 140 may be greater than 1 μm (e.g. greater than 10 μm, greater than 30 μm, greater than 50 μm, or greater than 100 μm), for example. For example, a vertical distance 497 between the heater structure 110 and the lid substrate 150 may be in the range of 500 nm to 10 μm. A vertical distance 498 between the membrane structure 120 and the infrared filter structure 410 may be in the range of 500 nm to 5 μm. FIG. 4i shows an example with an integrated IR-emitter/filter with TSV.

For example, a cavity including a heater membrane and a filter may be processed by an anodic bonding process of two wafers. Bonding may be done in a low pressure environment and so heater and filter are under (quasi-) vacuum. As the heater may be realized as a movable membrane, the heater may electrostatically be moved to substrate and cooled down during non-radiation operation-mode and may be moved away from substrate during radiation operation mode by applying different potential between substrate and heat spreader layer.

For example, due to vacuum in the respective cavities 130, 170 the power dissipation may be reduced as heat conduction is minimized in vacuum and heat radiation may now be the only dominating effect. The cooling down by a movable membrane may be beneficial for a fast switching between radiation and non-radiation operation mode.

More details and aspects are mentioned in connection with the embodiments described above or below. The embodiment shown in FIGS. 4a-4i may comprise one or more optional additional features corresponding to one or more aspects mentioned in connection with the proposed concept or one or more embodiments described above (e.g. FIG. 1-3) or below (e.g. FIG. 5a-7h).

Figure 5A:
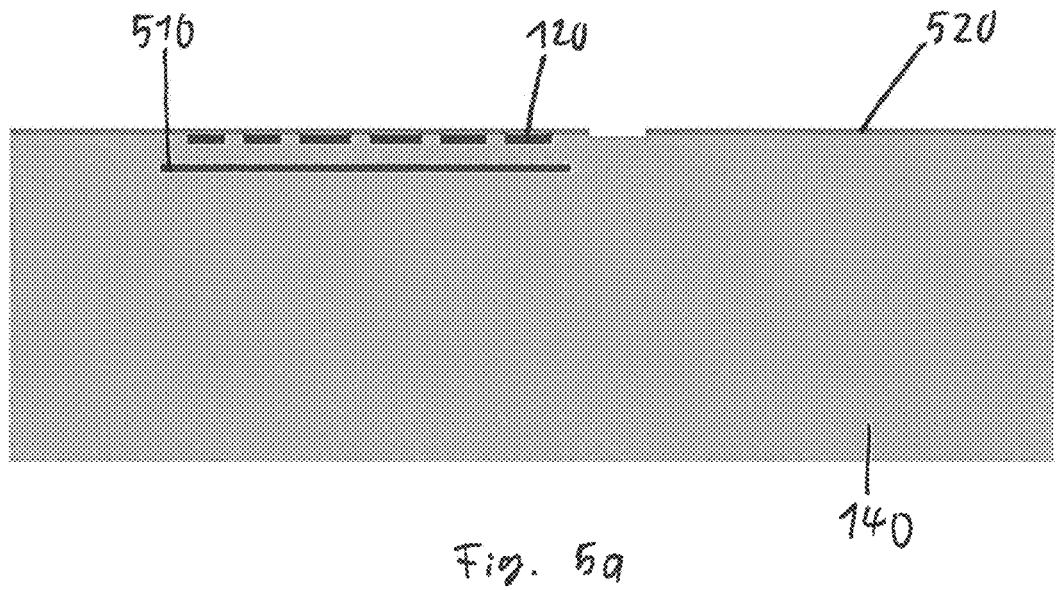
FIGS. 5a-5h show process steps for forming another light emitter device.

FIGS. 5a-5h show process steps for forming another light emitter device 500. The method for forming the light emitter device 500 may be similar to the method described in connection with FIG. 3. FIG. 5a shows a supporting substrate 140 on which a grounding layer 510, an insulating layer 520 and a membrane structure 120 are formed. For example, the supporting substrate 140 may be a glass based substrate. The grounding layer 510 may comprise an electrically conductive material (e.g. copper, tungsten or polysilicon), for example. For example, the insulating layer 520 may comprise a nitride (e.g. silicon nitride). The membrane structure 120 may comprise a heat spreader structure (e.g. formed from polysilicon). For example, in contrast to the process steps shown in FIGS. 4a-4i the supporting substrate 140 (e.g. a substrate wafer) may be formed from glass. For example, in contrast to the process steps shown in FIGS. 4a-4i instead of the infrared filter structure 410 in the supporting substrate 140 (e.g. a substrate wafer) an (electrical) grounding layer 510 (e.g. a ground layer) may be implemented to enable a connected counter-electrode for the movable membrane structure 120 (e.g. a moveable heater element).

Figure 5B:
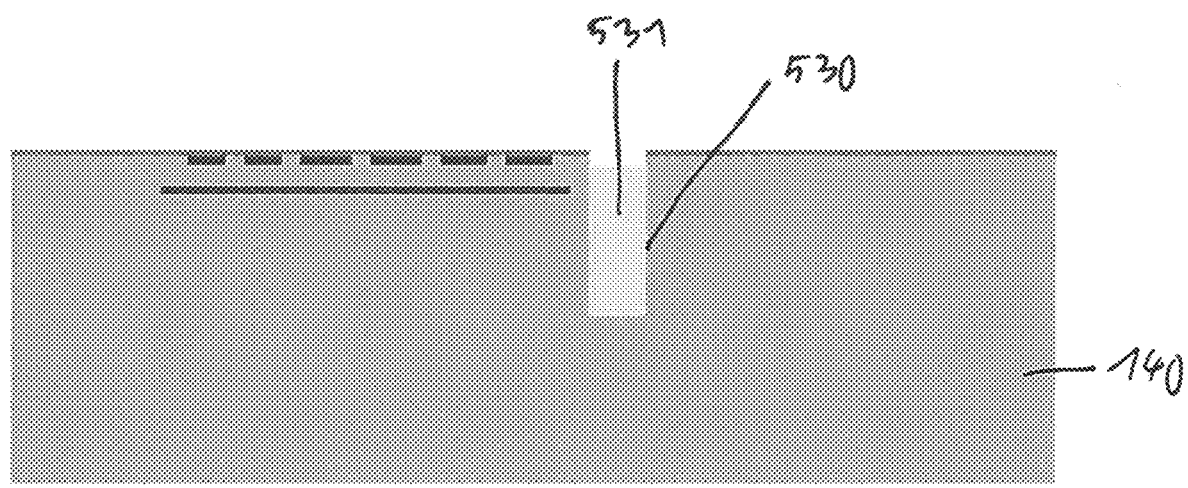

As shown in FIG. 5b a trench 530 is etched into the supporting substrate 140. Additionally, an electrically conductive material 531 (e.g. copper (Cu) or tungsten) is deposited inside the trench 530. For example, the trench 530 and the electrically conductive material 531 may form a TSV (e.g. a Cu-TSV). For example, in contrast to the process steps shown in FIGS. 4a-4i the insulating layer 441 or an isolation layer in the TSV may be omitted, as glass is already an isolation layer. The predefined current may be provided to the (not yet formed) heater structure 110 through the TSV or the electrically conductive material 531. For example, a further TSV may be formed in the supporting substrate 140 for providing the predefined current to the heater structure 110.

Figure 5C:
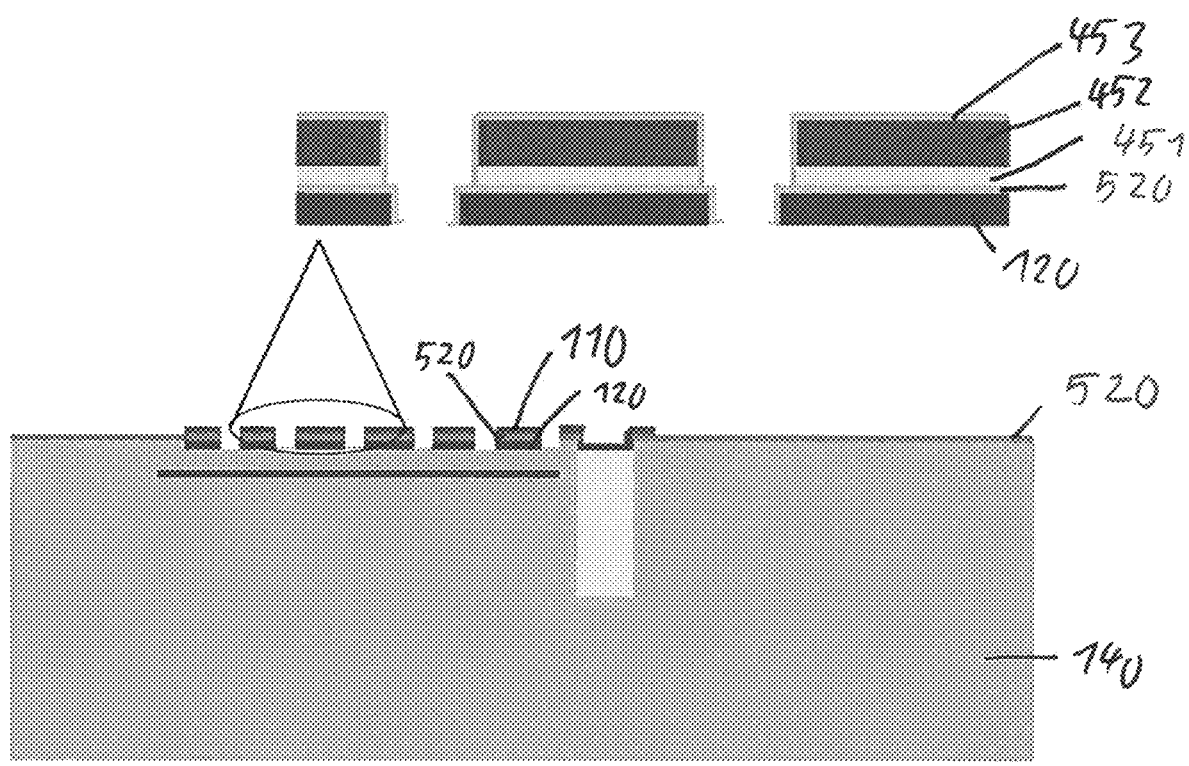

A heater structure 110 is formed on the membrane structure 120 as shown in FIG. 5c. The heater structure 110 comprises a first layer 451 comprising a first metal (e.g. titanium), a second layer 452 comprising a second metal (e.g. platinum) and covering the first layer 451, and an insulating layer 453 (e.g. a nitride) covering the second layer 452. The second insulating layer 430 is located between the heater structure 110 and the membrane structure 120.

Figure 5D:
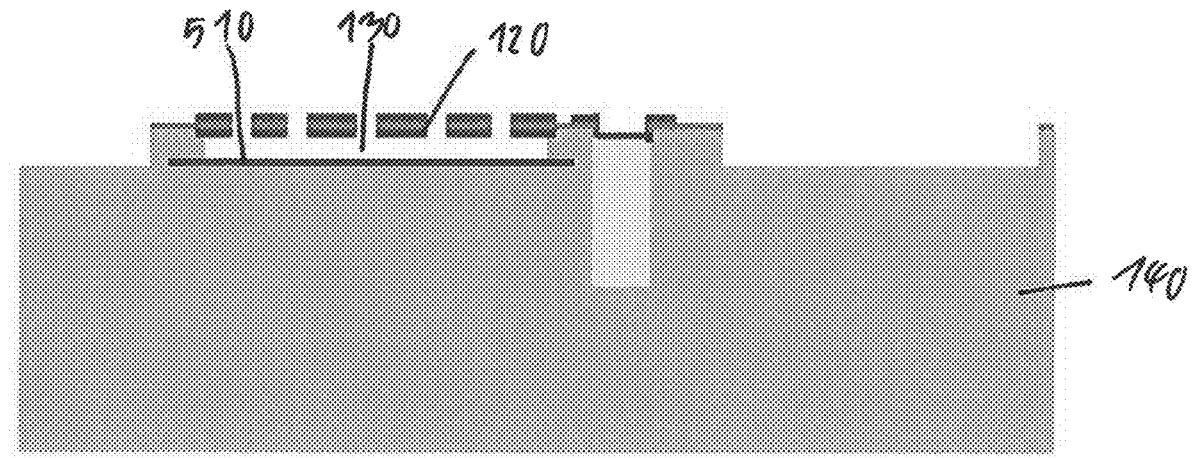

As shown in FIG. 5d a first cavity 130 is formed by etching the supporting substrate 140 between the membrane structure 120 and the grounding layer 510. Etching of the first supporting substrate 140 may comprise a glass release etch or an oxide release etch, for example.

Figure 5E:
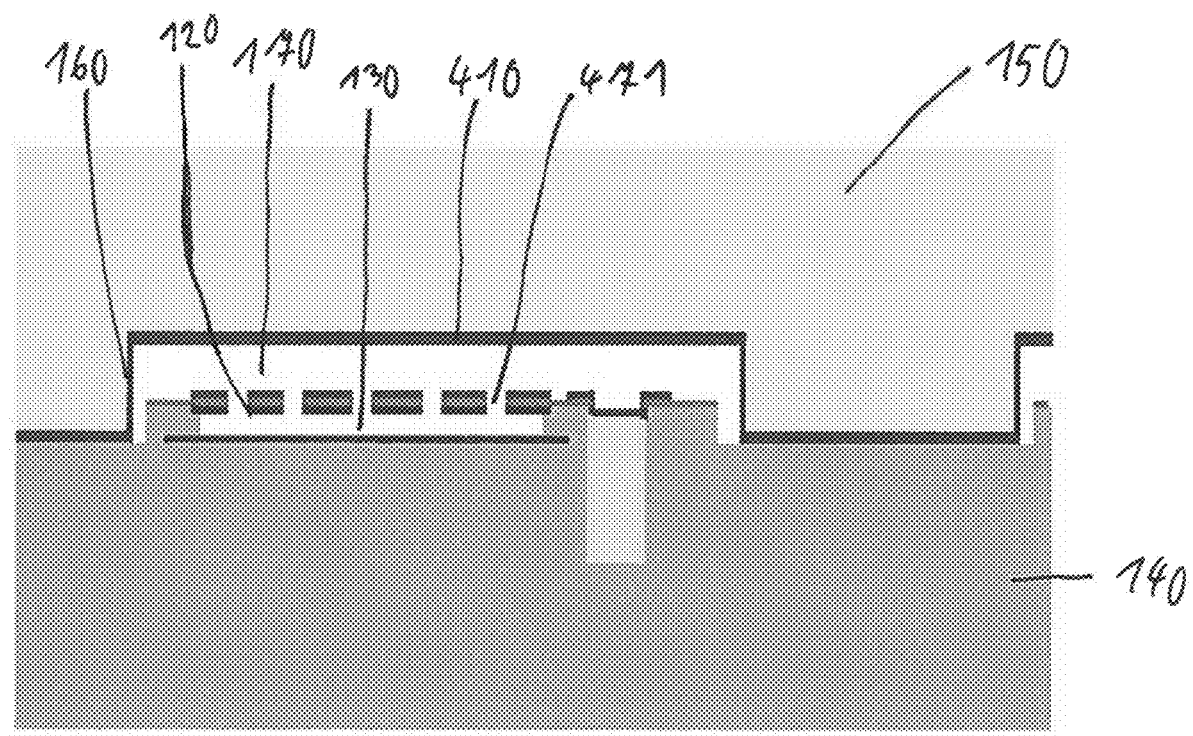

A lid substrate 150 (e.g. a structured Si or glass lid wafer) having a recess 160 is attached to the supporting substrate 140 as shown in FIG. 5e. The recess 160 forms a second cavity 170 between the membrane structure 120 and the lid substrate 150. An infrared filter structure 410 (e.g. a filter layer) is located adjacent to the lid substrate 150. The membrane structure 120 comprises a plurality of openings 471 which connect the first cavity 130 with the second cavity 170. For example, the lid substrate 150 may be anodic bonded to the supporting substrate 140 in vacuum. For example, the lid substrate 150 (e.g. a lid wafer) may be formed from silicon or glass and the infrared filter structure 410 (e.g. a filter layer) may be deposited on the lid substrate 150 (e.g. a structured lid wafer).

Figure 5F:
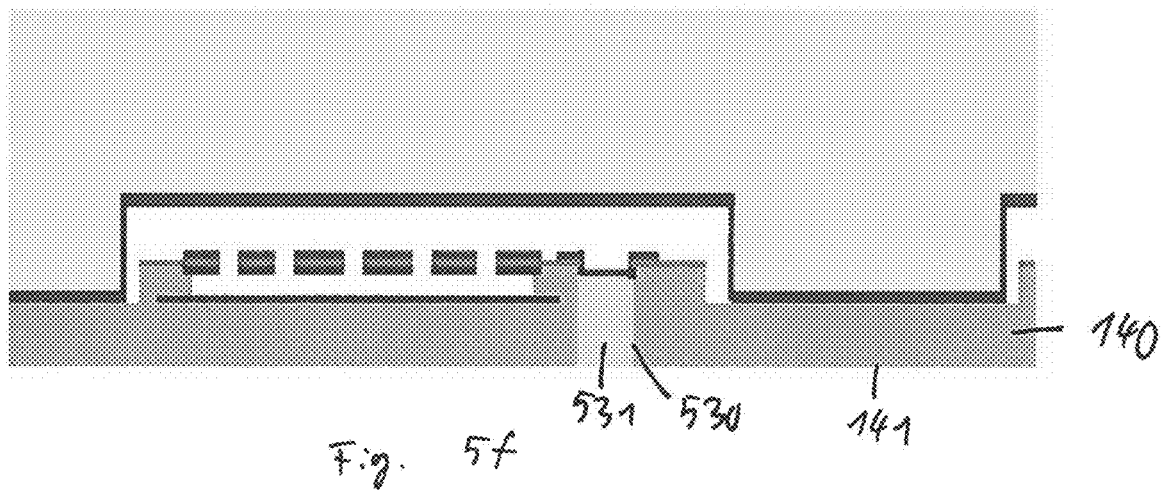

As shown in FIG. 5f the supporting substrate 140 is thinned such that the trench 530 is opened and the electrically conductive material 531 can be electrically contacted at a back side 141 of the supporting substrate 140.

Figure 5G:
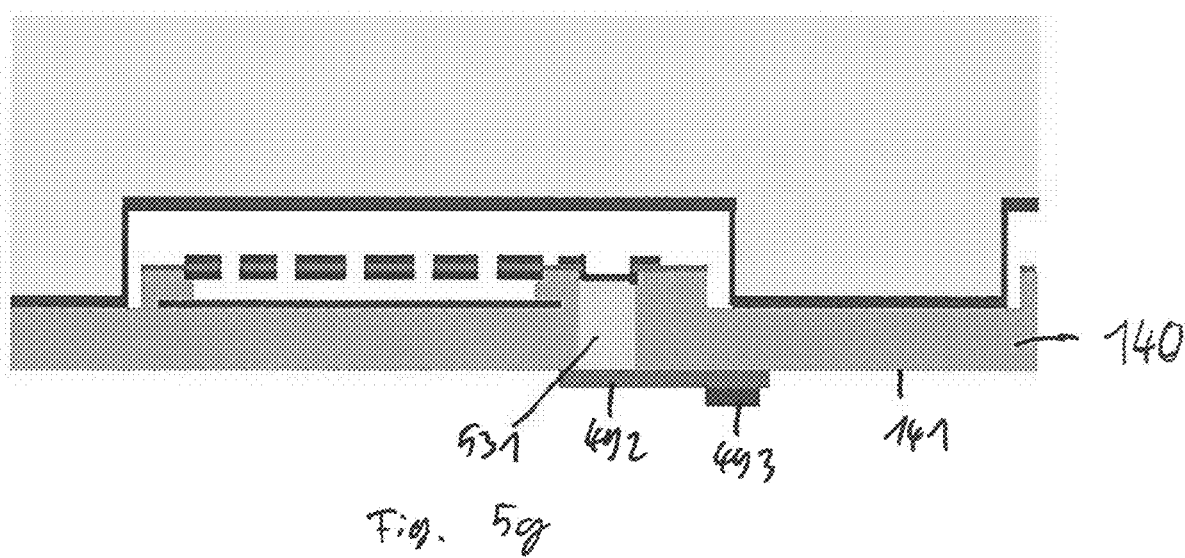

A redistribution layer 492 with a pad 493 is formed at or on the back side 141 of the supporting substrate 140 as shown in FIG. 5g. The redistribution layer 492 electrically contacts the electrically conductive material 531. For example, in contrast to the process steps shown in FIGS. 4a-4i the insulating layer 491 (e.g. an isolation layer) on the backside 141 (e.g. in the RDL 492) may be omitted or skipped, as glass is already an isolation layer.

Figure 5H:
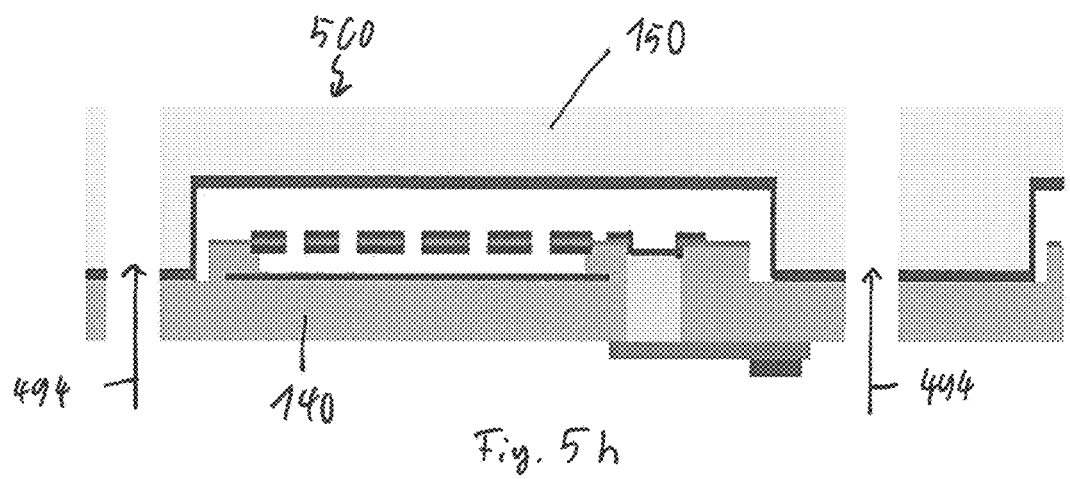

As shown in FIG. 5h the lid substrate 150 is thinned to a target thickness and a wafer sawing of the supporting substrate 140 and the lid substrate 150 is performed as indicated by arrows 494 to form the light emitter device 500. FIG. 5h shows an example with a filter on a lid-wafer and a glass substrate/Si or glass lid.

More details and aspects are mentioned in connection with the embodiments described above or below. The embodiment shown in FIGS. 5a-5h may comprise one or more optional additional features corresponding to one or more aspects mentioned in connection with the proposed concept or one or more embodiments described above (e.g. FIG. 1-4i) or below (e.g. FIG. 6a-7h).

Figure 6A:
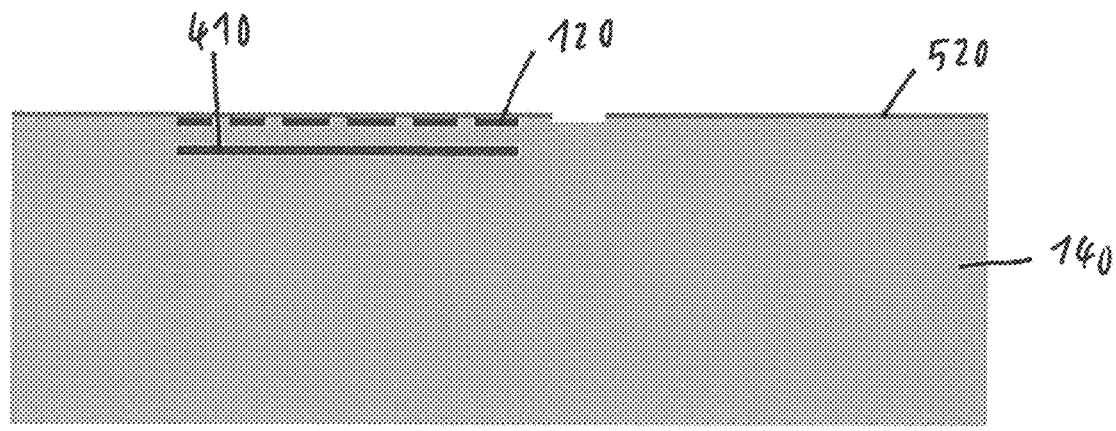
FIGS. 6a-6h show process steps for forming another light emitter device.

FIGS. 6a-6h show process steps for forming another light emitter device 600. The method for forming the light emitter device 600 may be similar to the method described in connection with FIG. 3. FIG. 6a shows a supporting substrate 140 on which an infrared filter structure 410, an insulating layer 520 and a membrane structure 120 are formed. For example, the supporting substrate 140 may be a glass based substrate. The membrane structure 120 may comprise a heat spreader structure (e.g. formed from polysilicon). For example, in contrast to the process steps shown in FIGS. 5a-5h the infrared filter structure 410 (e.g. a filter layer) may be implemented in the supporting substrate 150 (e.g. in a substrate layer).

Figure 6B:
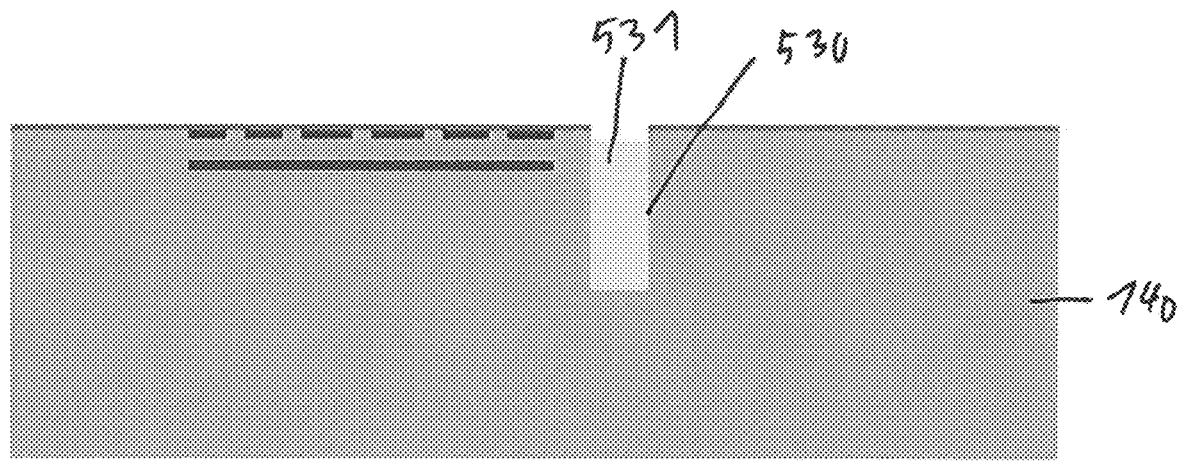

As shown in FIG. 6b a trench 530 is etched into the supporting substrate 140. Additionally, an electrically conductive material 531 (e.g. copper (Cu) or tungsten) is deposited inside the trench 530. For example, the trench 530 and the electrically conductive material 531 may form a TSV (e.g. a Cu-TSV). The predefined current may be provided to the (not yet formed) heater structure 110 through the TSV or the electrically conductive material 531. For example, a further TSV may be formed in the supporting substrate 140 for providing the predefined current to the heater structure 110.

Figure 6C:
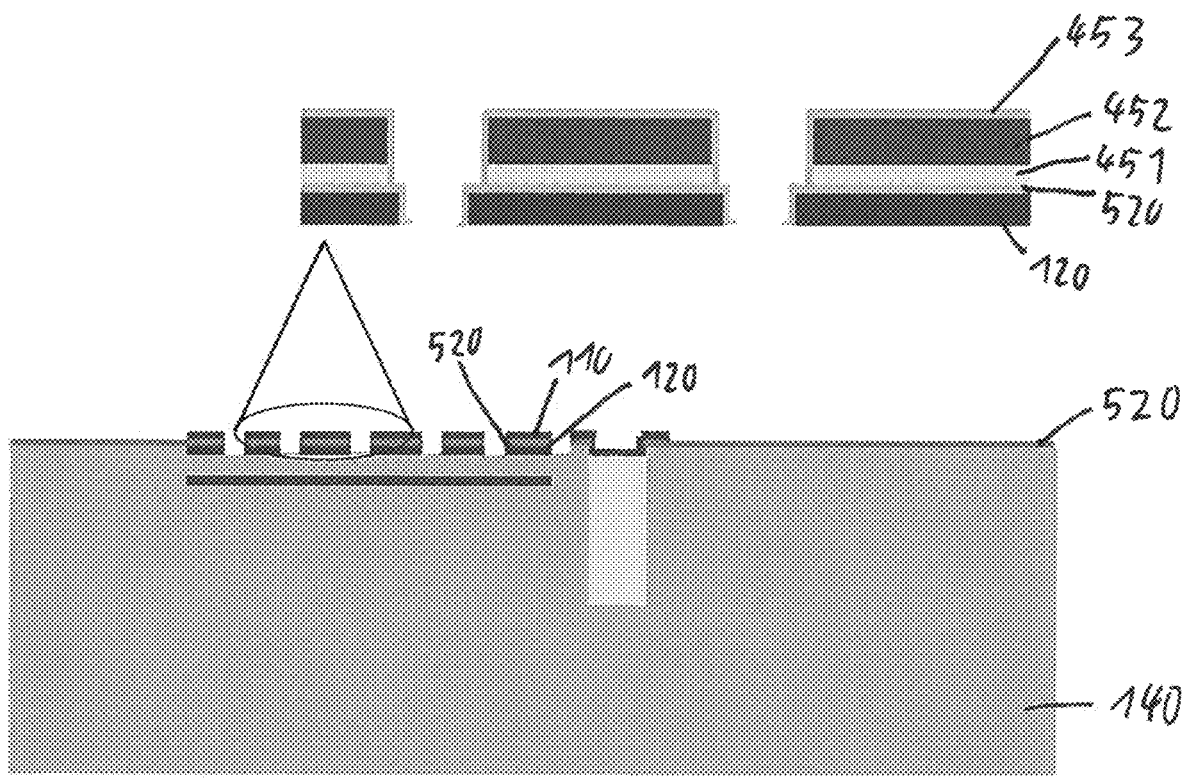

A heater structure 110 is formed on the membrane structure 120 as shown in FIG. 6c. The heater structure 110 comprises a first layer 451 comprising a first metal (e.g. titanium), a second layer 452 comprising a second metal (e.g. platinum) and covering the first layer 451, and an insulating layer 453 (e.g. a nitride) covering the second layer 452. The second insulating layer 430 is located between the heater structure 110 and the membrane structure 120.

Figure 6D:
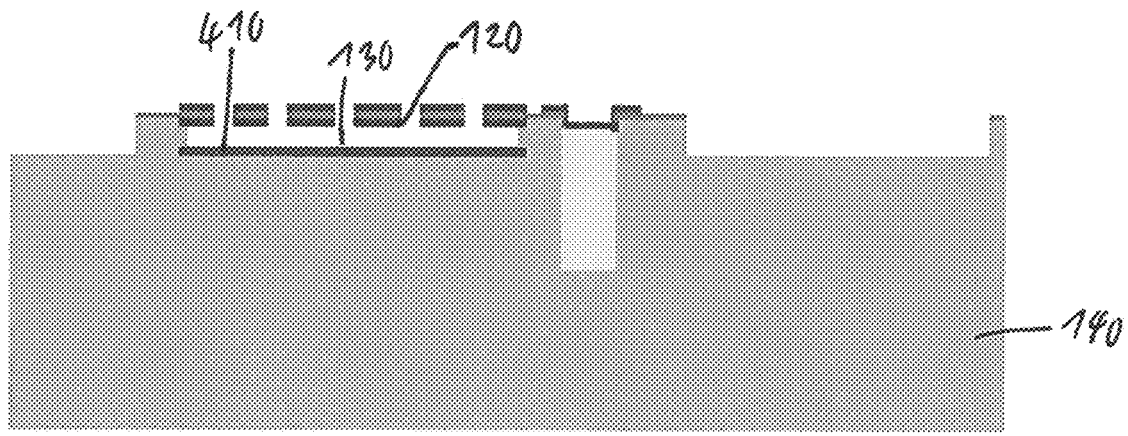

As shown in FIG. 6d a first cavity 130 is formed by etching the supporting substrate 140 between the membrane structure 120 and the infrared filter structure 410. Etching of the first supporting substrate 140 may comprise a glass release etch or an oxide release etch, for example.

Figure 6E:
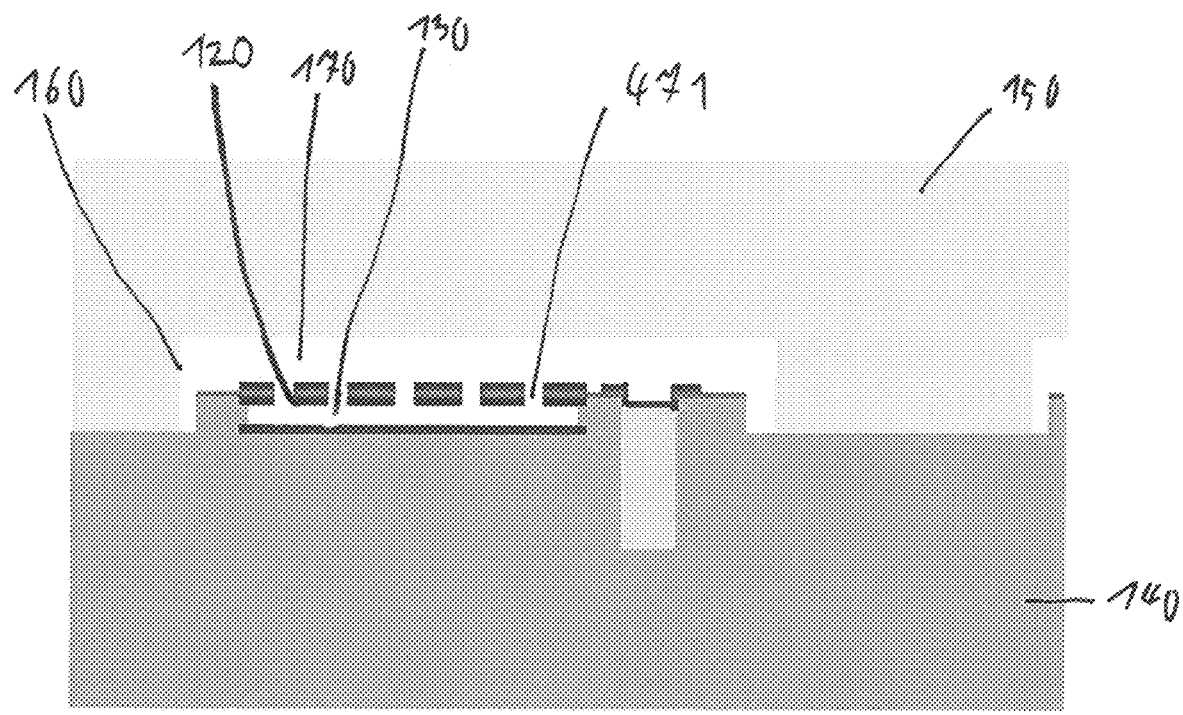

A lid substrate 150 (e.g. a silicon lid wafer) having a recess 160 is attached to the supporting substrate 140 as shown in FIG. 6e. The recess 160 forms a second cavity 170 between the membrane structure 120 and the lid substrate 150. The membrane structure 120 comprises a plurality of openings 471 which connect the first cavity 130 with the second cavity 170. For example, the lid substrate 150 may be anodic bonded to the supporting substrate 140 in vacuum.

Figure 6F:
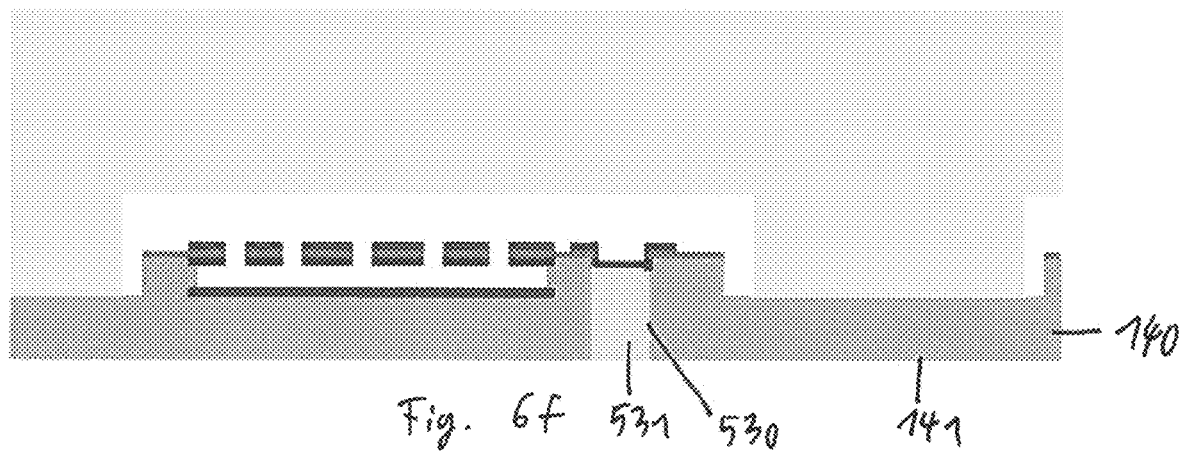

As shown in FIG. 6f the supporting substrate 140 is thinned such that the trench 530 is opened and the electrically conductive material 531 can be electrically contacted at a back side 141 of the supporting substrate 140.

Figure 6G:
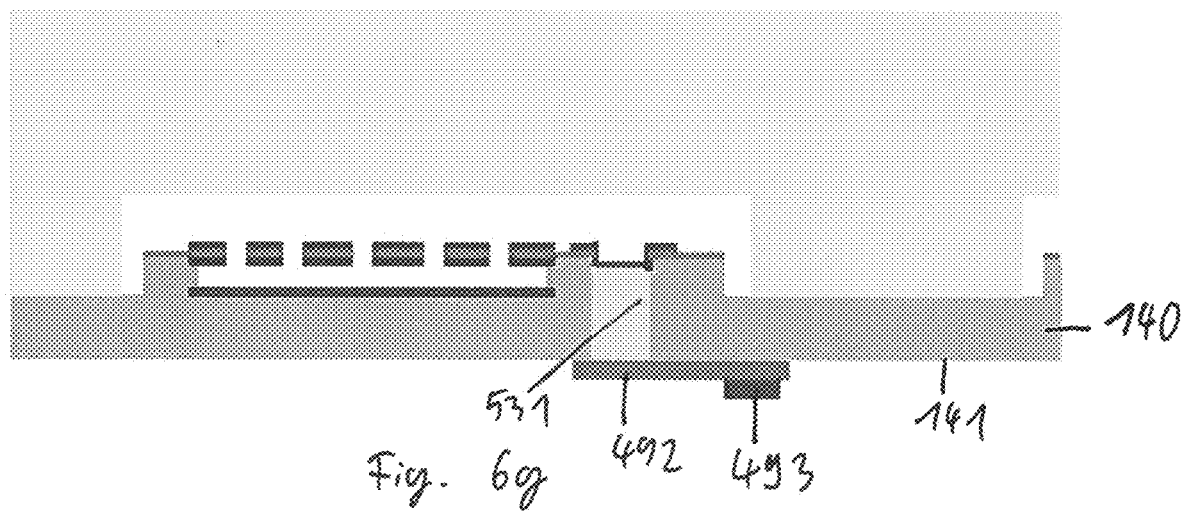

A redistribution layer 492 with a pad 493 is formed at or on the back side 141 of the supporting substrate 140 as shown in FIG. 6g. The redistribution layer 492 electrically contacts the electrically conductive material 531.

Figure 6H:
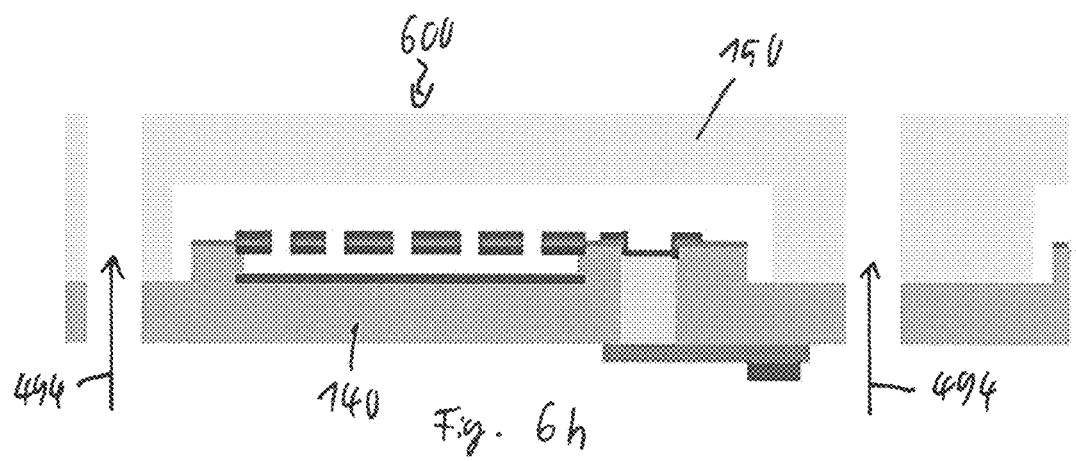

As shown in FIG. 6h the lid substrate 150 is thinned to a target thickness and a wafer sawing of the supporting substrate 140 and the lid substrate 150 is performed as indicated by arrows 494 to form the light emitter device 600. FIG. 6h shows an example with a filter on a substrate-wafer and a glass substrate/Si lid.

More details and aspects are mentioned in connection with the embodiments described above or below. The embodiment shown in FIGS. 6a-6h may comprise one or more optional additional features corresponding to one or more aspects mentioned in connection with the proposed concept or one or more embodiments described above (e.g. FIG. 1-5h) or below (e.g. FIG. 7a-7h).

Figure 7A:
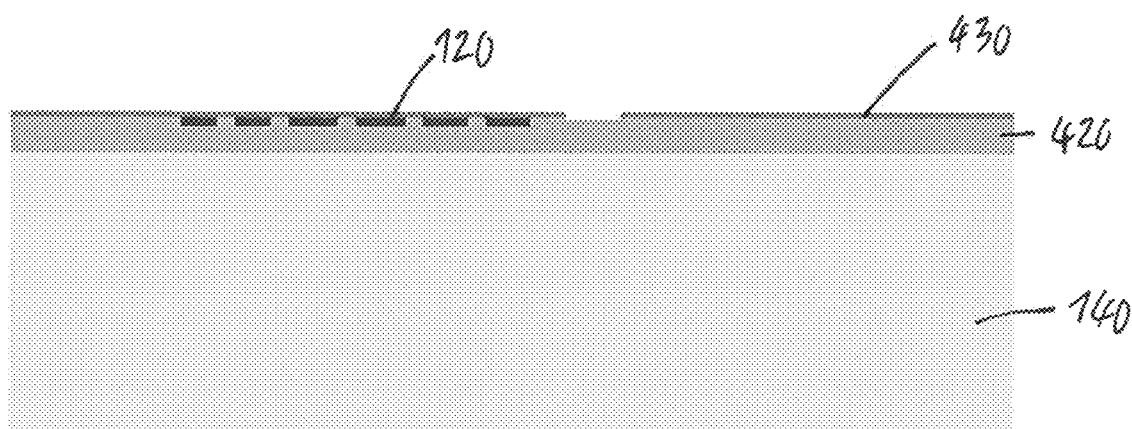
FIGS. 7a-7h show process steps for forming another light emitter device.

FIGS. 7a to 7h show process steps for forming another light emitter device 700. The method for forming the light emitter device 700 may be similar to the method described in connection with FIG. 3. FIG. 7a shows a supporting substrate 140 on which a first insulating layer 420, a second insulating layer 430 and a membrane structure 120 are formed. For example, the supporting substrate 140 may be a silicon based substrate. The membrane structure 120 may comprise a heat spreader structure (e.g. formed from polysilicon).

Figure 7B:
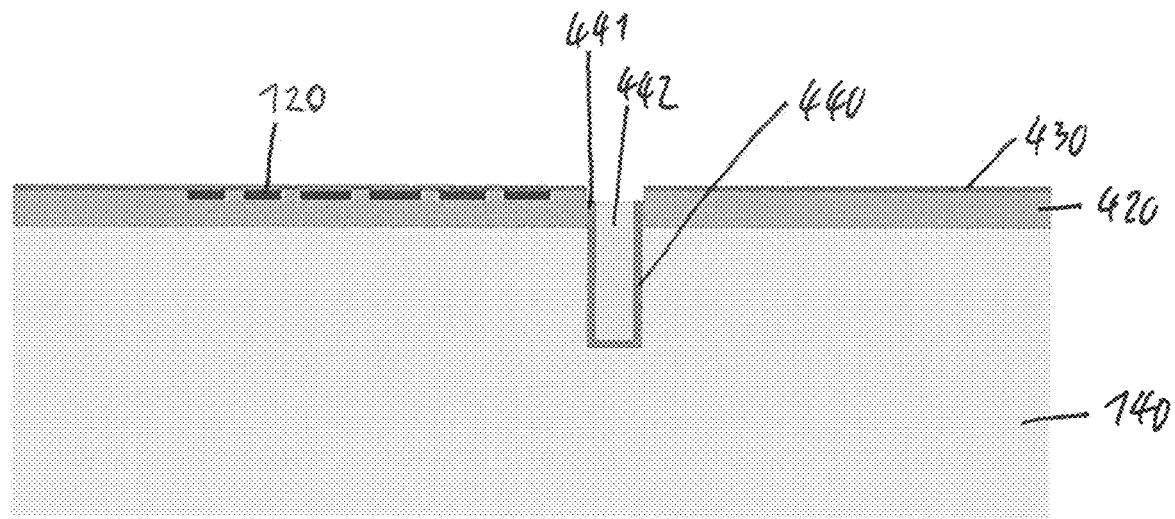

As shown in FIG. 7b a trench 440 is etched into the supporting substrate 140. Further, an insulating layer 441 is formed inside the trench 440. Additionally, an electrically conductive material 442 (e.g. copper (Cu) or tungsten) is deposited inside the trench 440. The insulating layer 441 isolates the electrically conductive material form the supporting substrate 140. For example, the trench 440, the insulating layer 441 and the electrically conductive material 442 may form a TSV (e.g. a Cu-TSV). The predefined current may be provided to the (not yet formed) heater structure 110 through the TSV or the electrically conductive material 442. For example, a further TSV may be formed in the supporting substrate 140 for providing the predefined current to the heater structure 110.

Figure 7C:
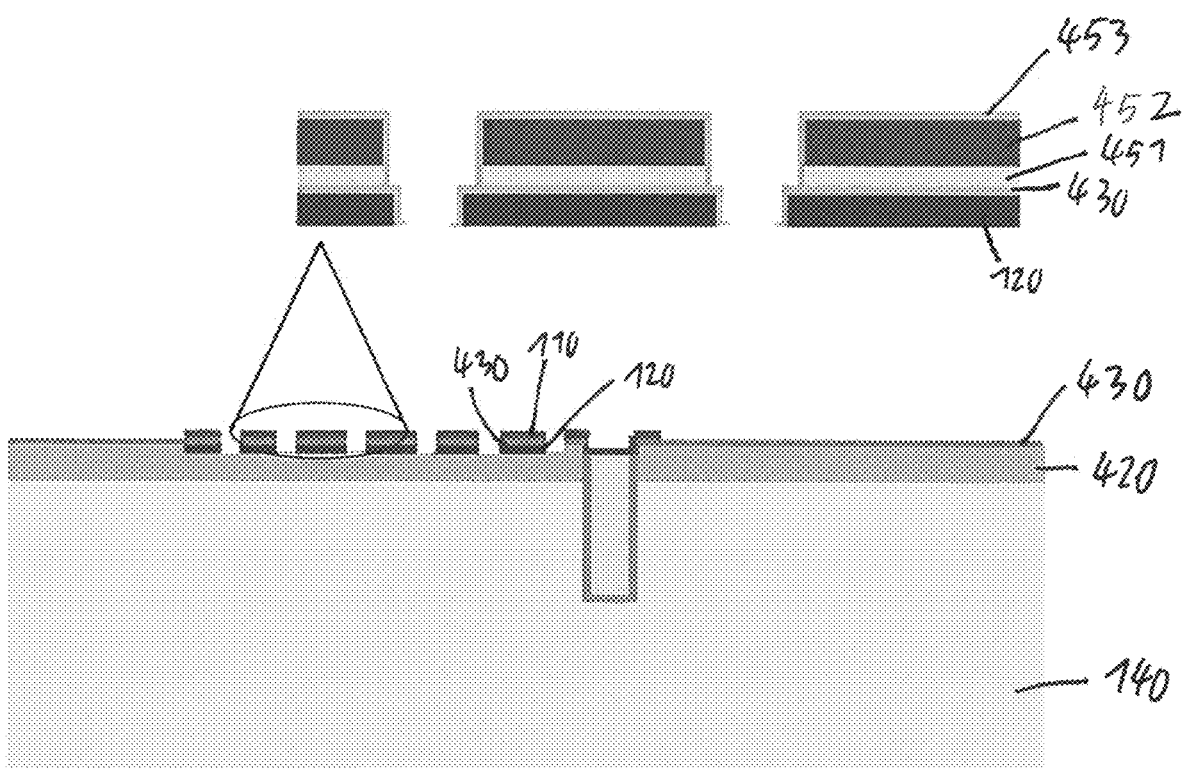

A heater structure 110 is formed on the membrane structure 120 as shown in FIG. 7c. The heater structure 110 comprises a first layer 451 comprising a first metal (e.g. titanium), a second layer 452 comprising a second metal (e.g. platinum) and covering the first layer 451, and an insulating layer 453 (e.g. a nitride) covering the second layer 452. The second insulating layer 430 is located between the heater structure 110 and the membrane structure 120.

Figure 7D:
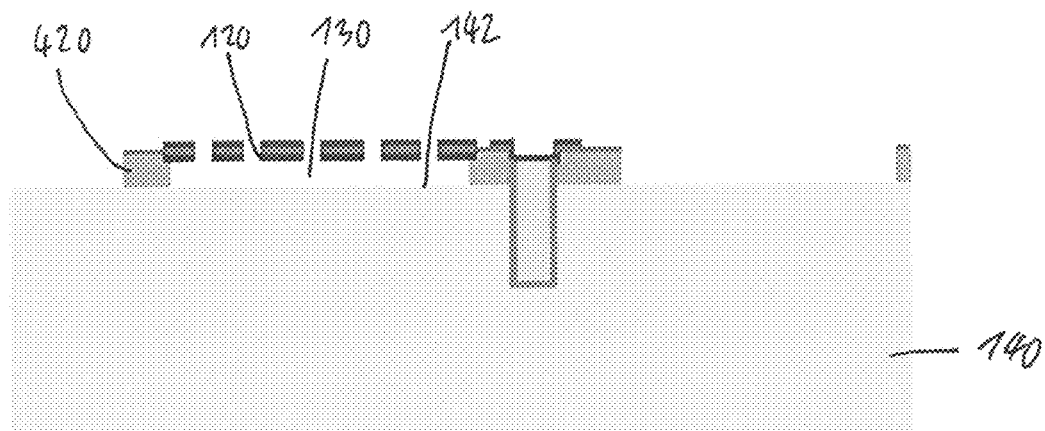

As shown in FIG. 7d a first cavity 130 is formed by etching the first insulating layer 420 between the membrane structure 120 and a front side 142 of the supporting substrate 140.

Figure 7E:
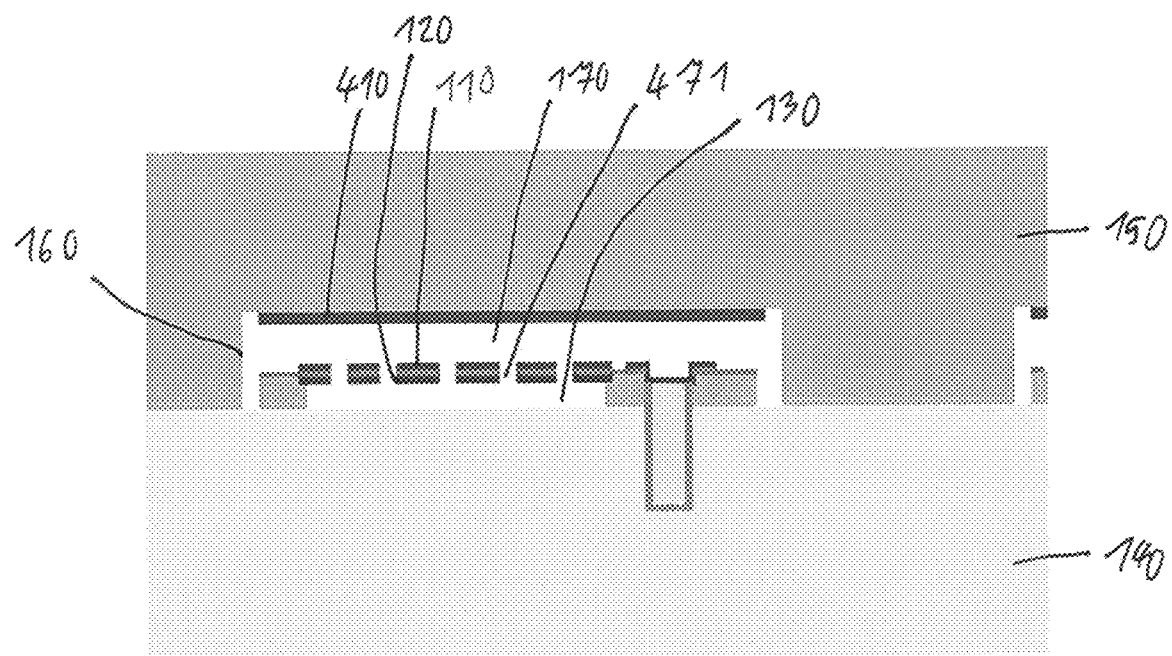

A lid substrate 150 (e.g. a structured Si or glass lid wafer) having a recess 160 is attached to the supporting substrate 140 as shown in FIG. 7e. An infrared filter structure 410 is located within the recess 160. Additionally, the recess 160 forms a second cavity 170 between the membrane structure 120 and the lid substrate 150. The membrane structure 120 comprises a plurality of openings 471 which connect the first cavity 130 with the second cavity 170. For example, the lid substrate 150 may be anodic bonded to the supporting substrate 140 in vacuum. For example, a structured filter layer may be formed on the lid substrate 150 (e.g. a lid glass wafer). For example, the supporting substrate 150 may be a silicon wafer.

Figure 7F:
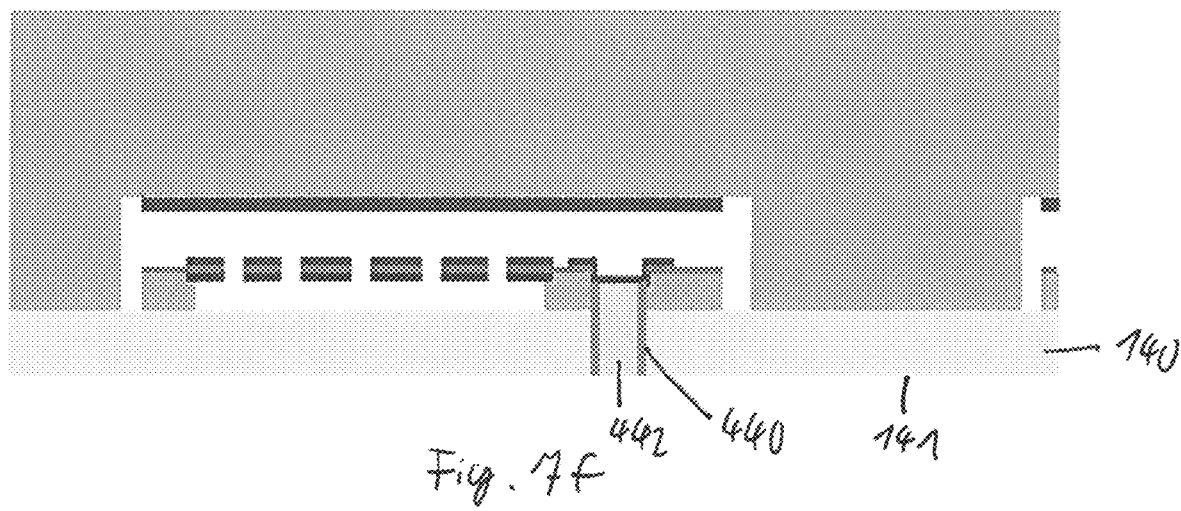

As shown in FIG. 7f the supporting substrate 140 is thinned such that the trench 440 is opened and the electrically conductive material 442 can be electrically contacted at a back side 141 of the supporting substrate 140.

Figure 7G:
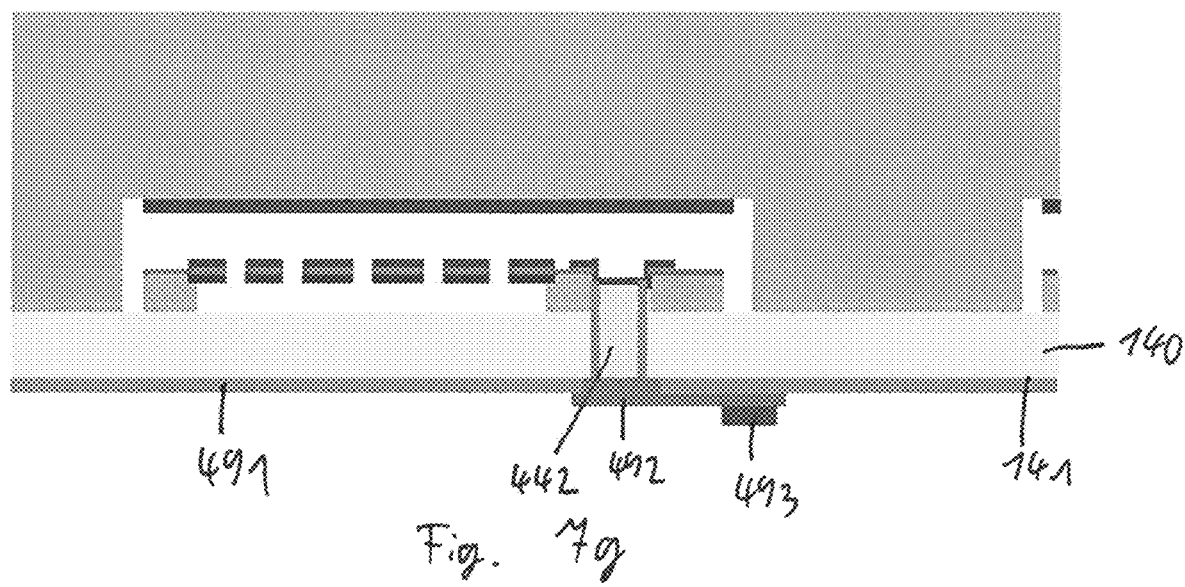

An insulating layer 491 (e.g. an oxide) and a redistribution layer 492 with a pad 493 is formed at or on the back side 141 of the supporting substrate 140 as shown in FIG. 7g. The redistribution layer 492 electrically contacts the electrically conductive material 442.

Figure 7H:
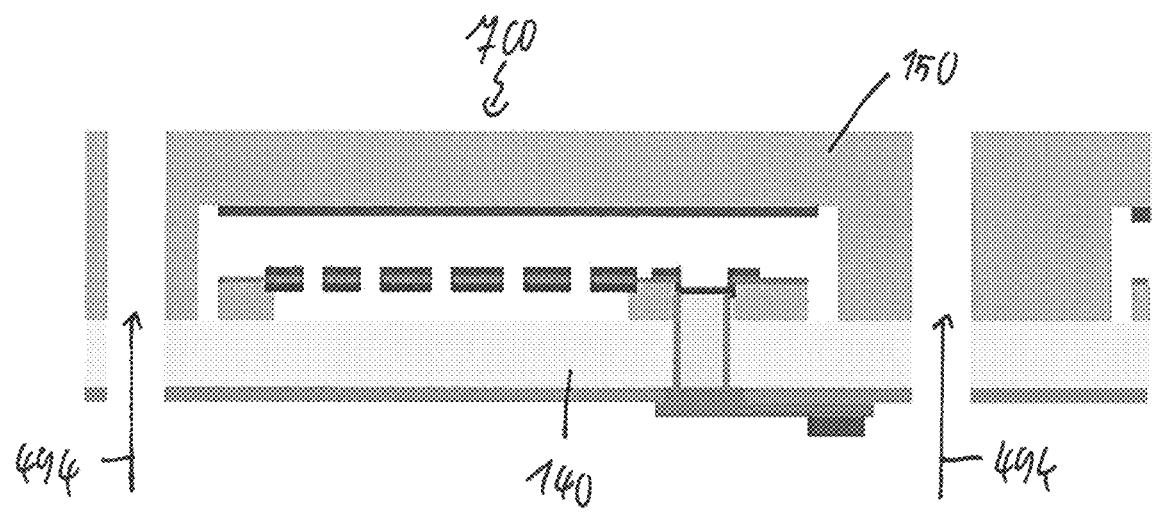

As shown in FIG. 7h the lid substrate 150 is thinned to a target thickness and a wafer sawing of the supporting substrate 140 and the lid substrate 150 is performed as indicated by arrows 494 to form the light emitter device 700. FIG. 7h shows an example with a filter on a lid-wafer and a Si substrate/glass lid.

More details and aspects are mentioned in connection with the embodiments described above or below. The embodiment shown in FIGS. 7a-7h may comprise one or more optional additional features corresponding to one or more aspects mentioned in connection with the proposed concept or one or more embodiments described above (e.g. FIG. 1-6h) or below.

Some embodiments relate to a structure and a method for integrated IR emitter and filter with minimized power consumption.

According to an aspect, integrated circuits like MEMS may be optimized with respect to size and height as well as power dissipation, especially if the chip is intended for implementation in mobile devices like a smartphone or tablet. Additionally, MEMS solutions may be optimized with respect to low costs.

According to an aspect, an IR emitter and an IR filter may be implemented in a single package with additional other chips with lowest possible size/height and costs.

According to an aspect, in the light emitting device the complete IR emitter/filter system may be optimized and at the same time the costs may be minimized. At the same time power dissipation may be minimized in application and acoustical cross-coupling due to an over-pressure may be avoided for certain variants.

According to an aspect, to reduce size and height and also to reduce the costs the forming of the light emitter device may be based on wafer level processes and wafer-to-wafer bond processes.

According to an aspect, an integration of filter and heater system on wafer level may reduce costs and may allow compact systems.

According to an aspect, the light emitter device may be realized with lower costs, lower height/size and low power consumption.

According to an aspect, other materials as well as other production steps could be used in the method for forming the light emitter device or to assemble the same or a comparable system.

According to an aspect, the principle of attracting the heated membrane structure towards the "cold" system to provide a fast cooldown may be optional for "frequency-uncritical" or steady-state systems (such as NDIR or slow photoacoustic spectroscopy (PAS) systems).

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A light emitter device comprising:
an emitter component comprising a heater structure arranged on a membrane structure, wherein the membrane structure is located above a first cavity, wherein the first cavity is located between the membrane structure and at least a portion of a supporting substrate of the emitter component, wherein the heater structure is configured to emit light, if a predefined current flows through the heater structure;
a lid substrate having a recess, wherein the lid substrate is attached to the emitter component so that the recess forms a second cavity between the membrane structure and the lid substrate, and wherein a gas pressure in the second cavity is less than 100 mbar; and
a first layer located vertically between the second cavity and the lid substrate, wherein the first layer is selected from a first group consisting of a light reflective layer and a light absorptive layer.

2. The light emitter device of claim 1, further comprising an optical filter structure located vertically between the first cavity and the supporting substrate.

3. The light emitter device of claim 1, wherein the first cavity and the second cavity are connected through at least one opening through the membrane structure.

4. The light emitter device of claim 1, further comprising a heater wiring structure for providing the predefined current, wherein the heater wiring structure comprises a via extending through the supporting substrate.

5. The light emitter device of claim 4, wherein the heater wiring structure comprises a redistribution wiring within a redistribution layer located adjacent to a surface of the supporting substrate.

6. The light emitter device of claim 1, further comprising a wiring structure for providing different voltages to a bias structure of the supporting substrate and to the membrane structure to electrostatically move at least a portion of the membrane structure towards the supporting substrate.

7. The light emitter device of claim 6,
wherein the bias structure of the supporting substrate comprises a first grounding layer located between the first cavity and the supporting substrate, and
wherein the wiring structure is electrically connected to the first grounding layer.

8. The light emitter device of claim 1, wherein at least a portion of the supporting substrate comprises a substrate selected from a second group consisting of a semiconductor substrate and a glass substrate.

9. The light emitter device of claim 1, wherein at least a portion of the lid substrate comprises a substrate selected from a second group consisting of a semiconductor substrate and a glass substrate.

10. The light emitter device of claim 1, wherein the membrane structure comprises a heat spreader structure, and wherein an insulating layer is located between the heat spreader structure and the heater structure.

11. The light emitter device of claim 1, wherein the heater structure is covered by a second insulating layer.

12. The light emitter device of claim 1, wherein at least a portion of the heater structure has a shape selected from a second group consisting of a meander shape and a ring shape.

13. The light emitter device of claim 1, wherein the lid substrate is attached to the emitter component in a gas-tight manner.

14. The light emitter device of claim 1, wherein the lid substrate is anodic bonded to the emitter component in a gas-tight manner.

15. The light emitter device of claim 1, wherein at an interface of the lid substrate and the supporting substrate a glass is in contact with a semiconductor material.

16. The light emitter device of claim 1, wherein the heater structure is configured to emit light with a spectrum comprising a maximal intensity at a wavelength greater than 700 nm and less than 1 mm.

17. A photoacoustic gas sensor comprising the light emitter device of claim 1.

18. A method for forming a light emitter device, the method comprising:
forming an emitter component comprising a heater structure arranged on a membrane structure, wherein the membrane structure is located above a first cavity, wherein the first cavity is located between the membrane structure and at least a portion of a supporting substrate of the emitter component, wherein the heater structure is configured to emit light, if a predefined current flows through the heater structure;
attaching a lid substrate having a recess to the emitter component so that the recess forms a second cavity between the membrane structure and the lid substrate, wherein a gas pressure in the second cavity is less than 100 mbar; and forming a layer vertically between the second cavity and the lid substrate, wherein the layer is selected from a group consisting of a light reflective layer and a light absorptive layer.

19. A light emitter device comprising:

an emitter component comprising a heater structure arranged on a membrane structure, wherein the membrane structure is located above a first cavity, wherein the first cavity is located between the membrane structure and at least a portion of a supporting substrate of the emitter component, wherein the heater structure is configured to emit light, if a predefined current flows through the heater structure;

a lid substrate having a recess, wherein the lid substrate is attached to the emitter component so that the recess forms a second cavity between the membrane structure and the lid substrate, and wherein a pressure in the second cavity is less than 100 mbar; and an optical filter structure located vertically between the first cavity and the supporting substrate.

20. A light emitter device comprising:

an emitter component comprising a heater structure arranged on a membrane structure, wherein the membrane structure is located above a first cavity, wherein the first cavity is located between the membrane structure and at least a portion of a supporting substrate of the emitter component, wherein the heater structure is configured to emit light, if a predefined current flows through the heater structure; and a lid substrate having a recess, wherein the lid substrate is attached to the emitter component so that the recess forms a second cavity between the membrane structure and the lid substrate, wherein the first cavity and the second cavity are connected through at least one opening through the membrane structure, and wherein a pressure in the second cavity is less than 100 mbar.

21. A light emitter device comprising:

an emitter component comprising a heater structure arranged on a membrane structure, wherein the membrane structure is located above a first cavity, wherein the first cavity is located between the membrane structure and at least a portion of a supporting substrate of the emitter component, wherein the heater structure is configured to emit light, if a predefined current flows through the heater structure;

a lid substrate having a recess, wherein the lid substrate is attached to the emitter component so that the recess forms a second cavity between the membrane structure and the lid substrate, and wherein a pressure in the second cavity is less than 100 mbar; and a heater wiring structure for providing the predefined current, wherein the heater wiring structure comprises a via extending through the supporting substrate.

22. A light emitter device comprising:

an emitter component comprising a heater structure arranged on a membrane structure, wherein the membrane structure is located above a first cavity, wherein the first cavity is located between the membrane structure and at least a portion of a supporting substrate of the emitter component, wherein the heater structure is configured to emit light, if a predefined current flows through the heater structure;

a lid substrate having a recess, wherein the lid substrate is attached to the emitter component so that the recess forms a second cavity between the membrane structure and the lid substrate, and wherein a pressure in the second cavity is less than 100 mbar; and a wiring structure for providing different voltages to a bias structure of the supporting substrate and to the membrane structure to electrostatically move at least a portion of the membrane structure towards the supporting substrate.

23. A light emitter device comprising:

an emitter component comprising a heater structure arranged on a membrane structure, wherein the membrane structure is located above a first cavity, wherein the first cavity is located between the membrane structure and at least a portion of a supporting substrate of the emitter component, wherein the heater structure is configured to emit light, if a predefined current flows through the heater structure; and a lid substrate having a recess, wherein the lid substrate is attached to the emitter component so that the recess forms a second cavity between the membrane structure and the lid substrate, wherein the membrane structure comprises a heat spreader structure, wherein an insulating layer is located between the heat spreader structure and the heater structure, and wherein a pressure in the second cavity is less than 100 mbar.

24. The light emitter device of claim 1, further comprising an optical filter structure located vertically between the second cavity and the lid substrate.

25. The light emitter device of claim 1, further comprising a wiring structure for providing different voltages to a bias structure of the lid substrate and to the membrane structure to electrostatically move at least a portion of the membrane structure towards the lid substrate.

* * * * *